[11] 3,634,656

| | | |
|---|---|---|
| [72] | Inventors | Kenneth Robert Krechmer<br>Beverly Hills;<br>Isidore William Salmon, Van Nuys, both of Calif. |
| [21] | Appl. No. | 679,410 |
| [22] | Filed | Oct. 31, 1967 |
| [45] | Patented | Jan. 11, 1972 |
| [73] | Assignee | Cantelesis Corporation |

[54] CREDIT CONTROL SYSTEM
27 Claims, 19 Drawing Figs.

[52] U.S. Cl. .................................................. 235/61.7 B, 235/61.11 D
[51] Int. Cl. .................................................. G06k 7/08
[50] Field of Search .......................................... 324/45; 235/61.11, 61.114, 61.116, 61.7; 340/149 A; 346/74 M

[56] References Cited
UNITED STATES PATENTS

| | | | |
|---|---|---|---|
| 2,779,540 | 1/1957 | Hoeppner ..................... | 235/61.12 |
| 3,146,342 | 8/1964 | Perotto ........................ | 346/74 |
| 3,384,899 | 5/1968 | Logerqvist .................... | 346/74 |
| 3,508,032 | 4/1970 | MacDuffee et al. .......... | 235/61.11 |
| 3,243,692 | 3/1966 | Heissmeier ................... | 324/45 X |
| 3,329,833 | 7/1967 | Dorsch ........................ | 324/45 X |

*Primary Examiner*—Daryl W. Cook
*Attorney*—Smyth, Roston & Pavitt

ABSTRACT: A credit card system is described wherein credit cards are equipped for magnetic recording of credit balances and cooperate with a control unit reproducing the recorded data, updating the value and recording the updated value on the card. The system is designed for slow card motion operation and is tamper proofed. The control unit may control automatic vending operations and can be adapted to selectively add or subtract numbers to the reproduced credit balance.

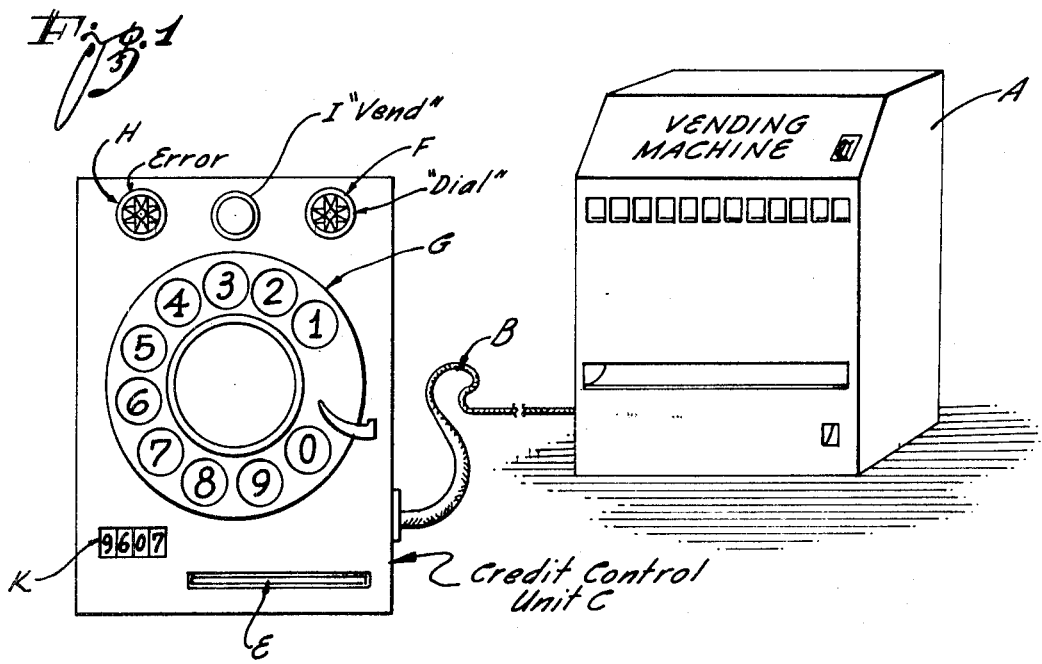
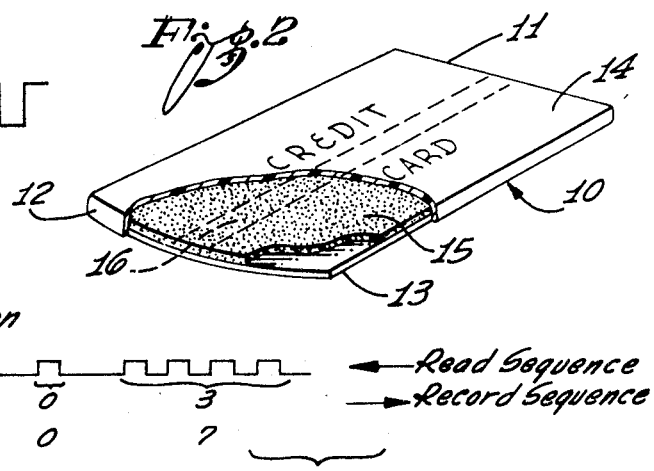
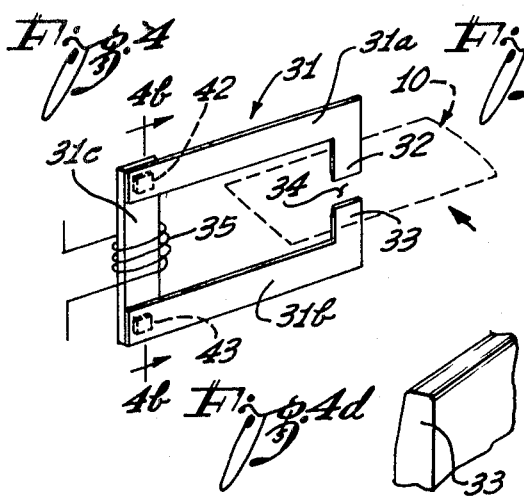
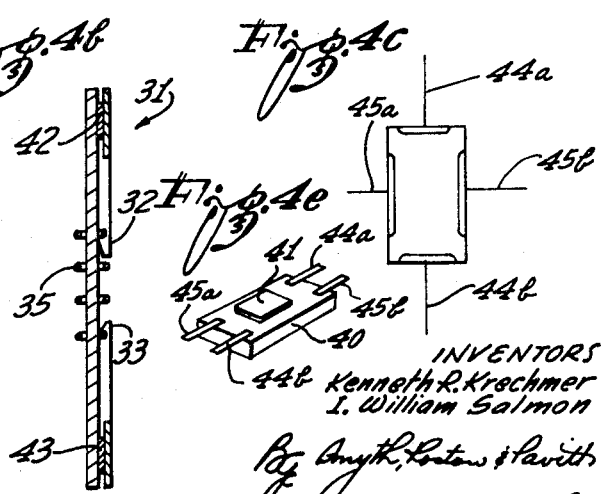
INVENTORS
Kenneth R. Krechmer
I. William Salmon
ATTORNEYS

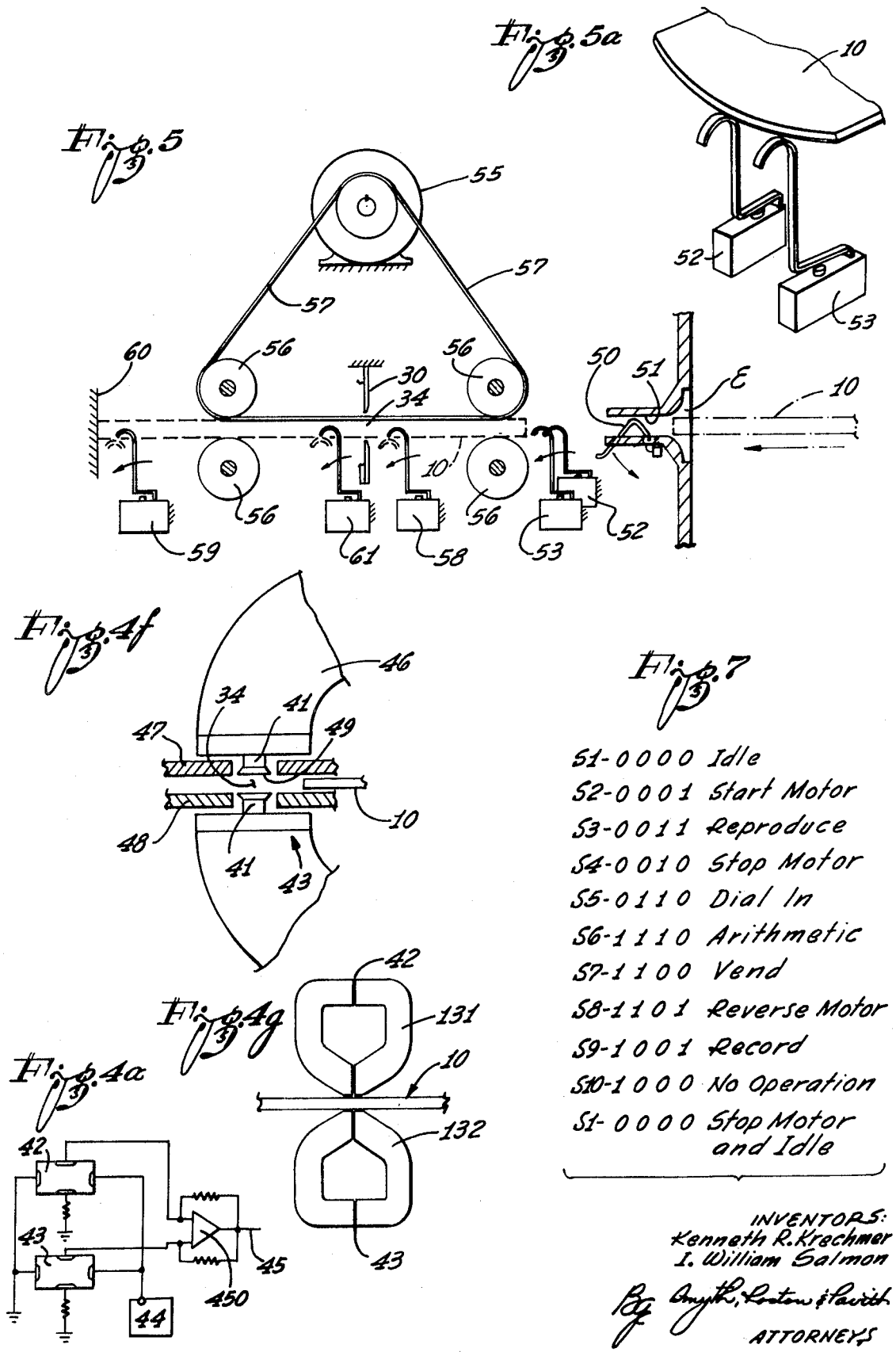

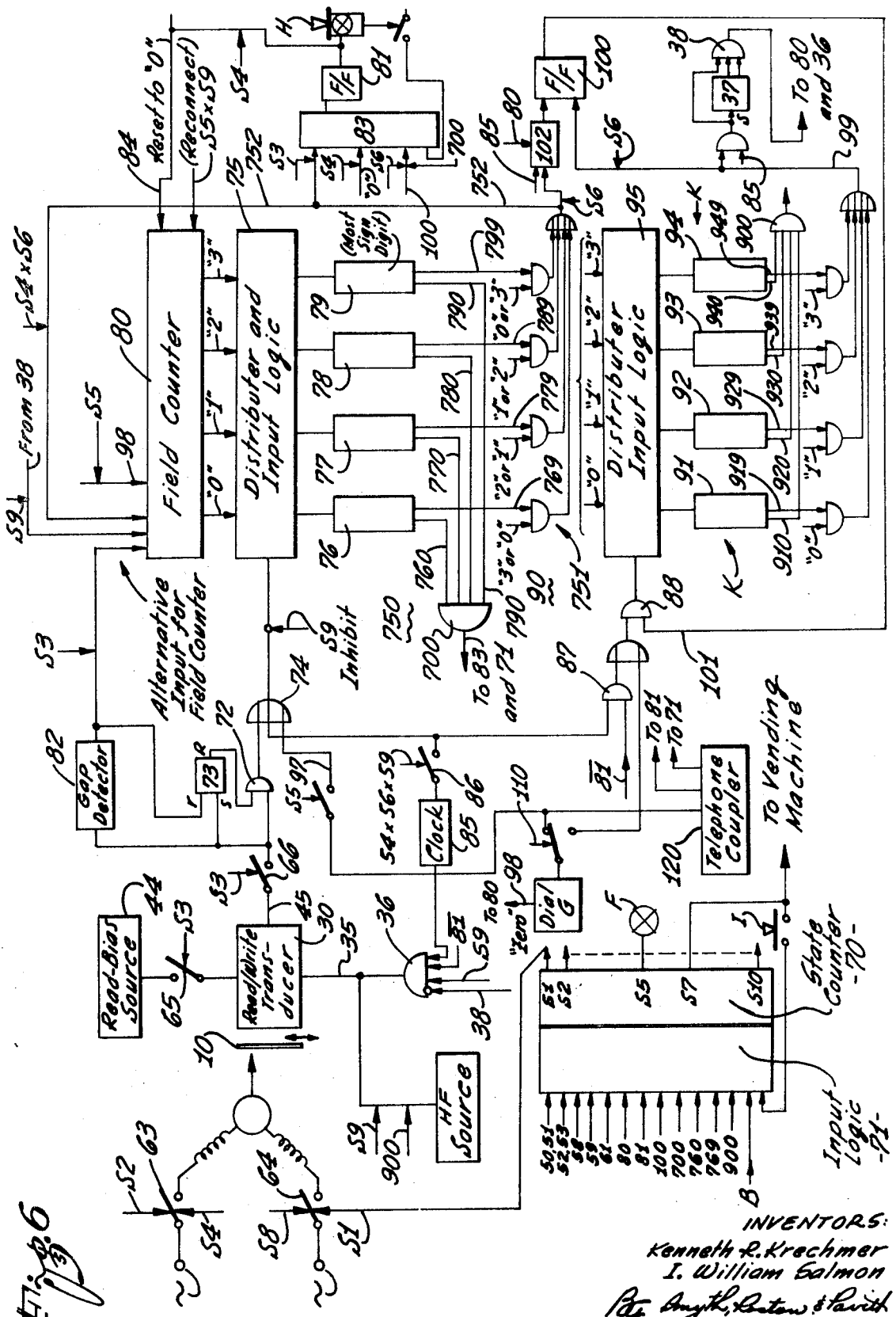

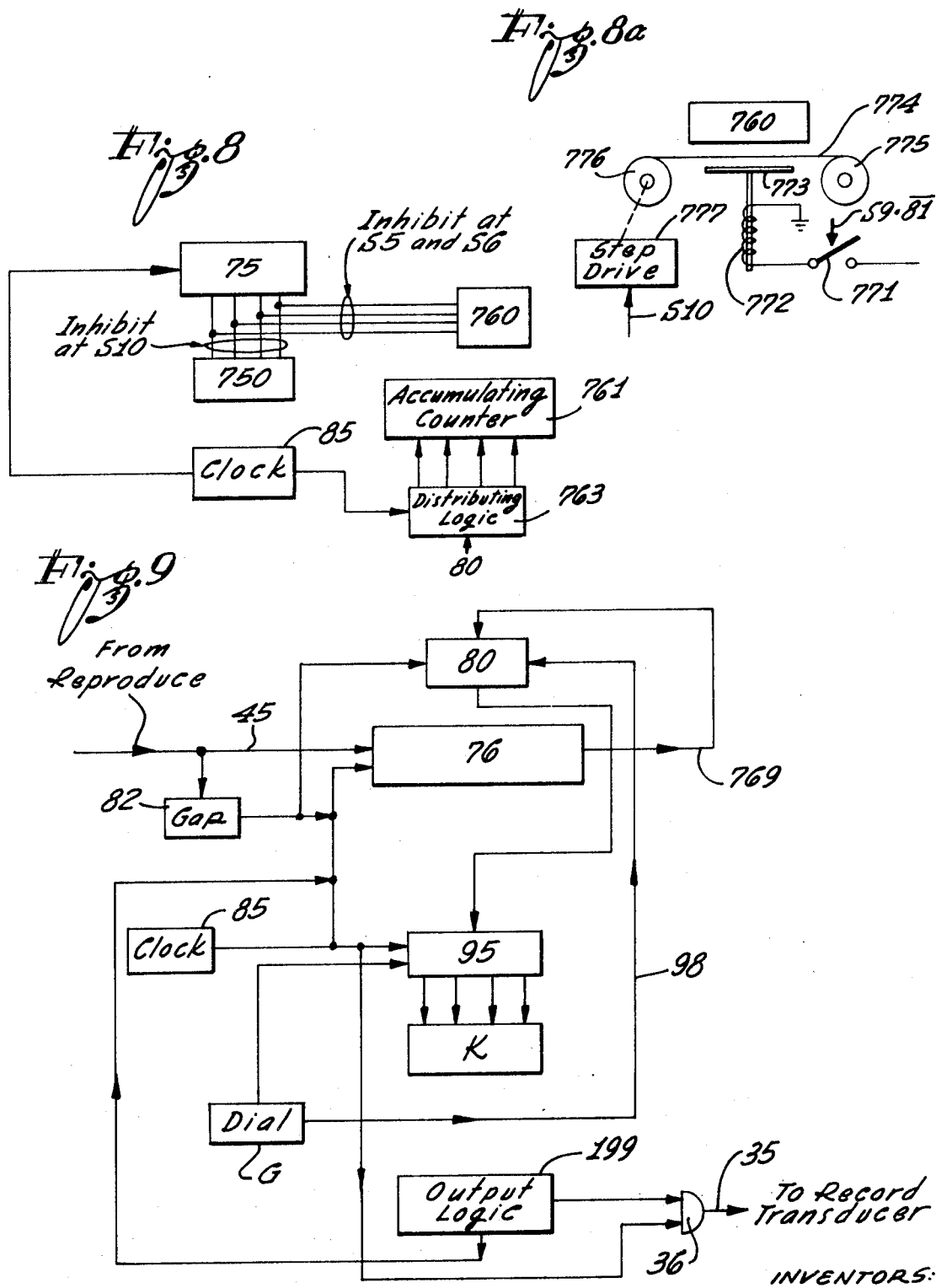

CREDIT CONTROL SYSTEM

The present invention relates to a revenue collection and control system cooperating with credit cards which store updatable, digital information concerning a particular credit balance. The system is provided for selectively changing the stored information in the card and may perform additional operation in response to successful completion of an updating of the credit balance as stored in a card.

Conventional credit card "systems" usually operate with a credit card which is either a means for identifying its user to the person to whom the card is presented in lieu of negotiable currency, or to establish a credit status of the bearer of the card so that the person extending credit upon presentation of the card is reasonably certain that he will be able to collect payment for the goods or services he has provided the user of the card. The card may additionally hold information such as an account number, but this serves only for facilitating bookkeeping. The card itself may implicitly limit the amount of credit which can and should be extended to the user and which is therefore regarded as guaranteed. However, the card does not represent any particular amount of money, it is not the equivalent of negotiable currency, i.e., it does not represent any cash value. Moreover, the purpose of the card requires always two people, the holder of the card and a person to whom this card is presented so that he may extend credit; its very use raises the problem of subsequent collection. The card cannot be used in automated establishments. Moreover, the very nature of the credit card as credit identification restricts use to persons whose credit can be established to the satisfaction of those who issue the card, because of the problem of subsequent collection. There is, therefore, a need for combining the advantages of the principles of the credit card system, such as the elimination of cash payments at the time services are rendered or goods are transferred, with the advantages of direct cash payment, where the general credit status of the payer is immaterial. The system should permit extension to coin-operated vending machines which do not require any attendance, and should eliminate subsequent problems of collection including the still existing uncertainty thereof, as well as the generally undesired increase in bookkeeping.

The system, in accordance with the present invention, has as its principal component a credit card on which is recorded information concerning a credit balance. The credit balance as recorded may be credit available to the holder of the card at that time. The prospective user, therefore, can purchase such a card for a particular price and that price will be the initial credit balance as recorded on the card. Whether this purchase is cash or on credit concerns only the card issuing party and the user. In other words, it is optional whether the uncertainties of the regular card systems are introduced into the present system and has nothing to do with the acts of payment performed subsequently by means of the card. The card now has direct and immediate cash value. Alternatively, the card may be, in the conventional sense, a credit card and the credit balance as recorded is the sum of previous purchases. The person to whom the card is presented has then the possibility to check whether the holder has exceeded the maximum credit, while the holder pays later the sum total of what is recorded on the card.

While sophistication and extension of the system is possible, the most simple implementation includes cards having a magnetizable layer on which are recorded serially manifestations of decimal digits representative of the credit balance. The data are recorded preferably in a single track. Further details of the preferred format for recording will be discussed more fully below. Presently it suffices to state that the sequence of recordings along that track can be converted into pulse groups, each group being separated from the others, each group representing a decimal digit.

The magnetic layer is sandwiched in between two layers of nonmagnetic, or better, nonmagnetizable material such as plastic, cardboard or the like. The magnetizable layer is, therefore, protected and not directly accessible. For purposes of providing greater security, user identification may be provided additionally on the card but this is not essential in principle. The holder must thus guard and protect that card just as he has to guard coins and bills, but he does not need to guard individual bills, handling of change, etc.

The counterpart to such cards is a credit control unit having as its principal function the updating of the credit balance on a card. Assuming that the current balance of the card represents cash value to the user, then the principal function of the credit control unit will be the subtraction of preselectable numbers representing preselectable amounts of money from the current credit balance in the card and recording thereon a substitute, new and diminished credit balance, provided the preselected number does not exceed the available credit balance. The completion of that operation is then the completion of financial transaction pursuant to which the bearer of the card has made payment in the amount of the preselected number by which his credit balance was reduced.

The credit control unit, therefore, is comprised of a transducing means capable of reproducing the recorded data. In view of the fact that for protective reasons the credit card has the magnetic layer sandwiched in between two protective layers, the magnetic recording thereon will preferably be in a format wherein the magnetic axes are not in the plane of extension of the credit card, but they extend normal to the track; two directions are available here. The transducer reading the credit card includes means for defining and, possibly not necessarily, for completing a magnetic circuit path. The transducer has a gap through which the card may pass and the magnetic circuit path extends through the card when in the gap. The magnetization recording in the card has direction to induce flux in one or the opposite direction in the gap and through the entire magnetic circuit path. The gap has dimensions along the direction of the flux sufficient for clearing the card. Transverse thereto and in the direction of motion of the card through the gap, the gap has dimensions smaller than the bit size on the card along the track. Transverse to either of the two other directions, the gap dimension is the size of the recording of one bit of information in the card. The magnetic circuit path includes at least one Hall generator appropriately electrically biased and having sense electrodes. In dependence upon the direction of the induced flux a voltage of one or the opposite polarity will be provided across the sense electrodes. In the absence of any induced field the sense voltage will be zero.

Since the Hall generator is a DC responsive device, the card can be moved slowly and is conducive to limiting wear and tear on the card. Speed is not of the essence in the system, and can be as low as 1 i.p.s. or even lower. Thus, reading of the information on the card may well take several seconds. The electrical pulses which can be drawn from the Hall generator resulting from digitally significant flux reversals along the track in the card follow each other at a sufficiently slow pace so that electromechanical counters can be used into which these pulses are set accordingly. It is important that a "read-pulse" is not an electrical signal resulting from sensing a single magnetic flux reversal in the layer, as that requires differentiation. Instead, the "read-pulse" is the electrical signal set up by the Hall generator either in between two flux reversals, then depending solely on the existing flux strength detected and not on the duration of sensing. Alternatively a "read-pulse" can be defined after each flux reversal, then depending on the attainment of a new level.

The use of electromechanical counters in lieu of electronic counters is strictly a matter of economics, but it is an important feature that the inventive system lends itself to the utilization of economical components such as simple electromechanical counters. Normal, inductive transducers usually have to operate at signal frequencies which are in excess of the frequency at which electromechanical counters can be operated. Since the Hall generator is a DC device responding equally well to stationary, quasi stationary and even fast varying magnetic fields, slow card motion is permitted, which in turn makes utilization of simple, slow operating counters feasible.

The various decades of the decimal numbers represented by recorded pulses are separated so that serial handling is possible. For example, for a more or less constant speed operation, reproduced data pulses following each other at a particular rate are assigned to one decade, while a larger pause after a pulse (temporary or permanent rate reduction) is recognized at the end of a decade. Thus, an extended pause between respective two pulses can be used to control changeover for the setting of pulses from one decade counter to another decade counter.

The number set into the counters will be displayed enabling the user at that point to learn directly what the credit balance is, as this is not directly ascertainable from the card. The credit control unit is now additionally equipped with selector means basically operable for the selection of numbers representing a particular amount of money, which, for example, the user of the card intends to pay and, which, therefore, is to be subtracted from the credit balance. It has been found suitable to use a regular telephone dial as selector so that the user will then dial into the system a number. That number, when dialed in, will then be processed, for example, in that it is being subtracted from the number of the current credit balance.

Having completed this operation, payment has, in fact, been made by the user. If, for example, the credit control unit is connected to a vending machine, the purchase can now be made in the usual way of operating such a machine. Thereafter the new credit balance is recorded onto the card. It can thus readily be seen that the system enables the user to make payments for any desired amount within the credit balance available to him. The unit can be installed, for example, in a store where the user makes payment in this manner in lieu of cash, checks, or other types of payment. The attendant or salesman merely has to watch that the proper amount was dialed in or he may do this himself, and after recording of the new credit balance, the transaction is completed.

The system lends itself, furthermore, to easy adaption or even normal inclusion of circuitry operating it in a manner that the dialed-in amount is, in effect, being added to the credit balance. The adding operation can be expected to be made by an attendant, bank teller, etc., after payment to him by check or currency and because the holder of the card wishes to extend the amount of credit on his card.

Easy adaptation of this system makes it possible to operate it as a debit system as far as the user is concerned. Each time a purchase is being made or a service is accepted, the corresponding amount is dialed in and is added to the credit balance; in this case the card is analogous to a conventional "credit" card and is a "debit" card for its user. It permits also a fast credit check, because the person to whom such a card is presented can check the credit balance which the user has to pay; if that amount is too high, acceptance of the card may be refused. After a certain period of time the user makes payment in accordance with the sum total recorded on the "debit" card. The combined use of debit cards and credit cards in any environment, attended or unattended, lends versatility to the system.

The system can be extended in that such a credit control unit is normally or selectively provided for online operation. It may be coupled, for example, to a telephone line and established next to a telephone. The user makes a normal telephone call to his bank and requests that the bank couple the computer of the bank handling the accounts to the telephone receiver at the bank. He then dials in the particular amount into the credit controller unit, set for addition. The credit control unit adds that amount to the credit on the card and the dialed-in pulses are concurrently transmitted through the telephone to the computer in the bank and his account is debited with that amount. The system is very versatile and combines digital techniques with simplicity as high speed operation is neither required nor even desired. The system is designed with numerous features concerning factors of safety and "tamperproofing" the system.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIG. 1 illustrates somewhat schematically the front panel of the credit controller unit in accordance with the system of the present invention, including connection of the unit to a vending machine;

FIG. 2 illustrates in perspective view a credit card for the system of the present invention;

FIG. 3 illustrates a diagram of a representative pulse pattern as it may be recorded along a track or a card as shown in FIG. 2;

FIG. 3a illustrates the same pulse pattern shown in FIG. 3 but in a different recording format;

FIG. 4 illustrates in perspective view a record-reproduce transducer used in the unit shown in FIG. 1 for cooperation with a card as shown in FIG. 2;

FIG. 4a illustrates representatively a circuit for combining the outputs of two Hall generators biased in common;

FIGS. 4b, 4c, 4d and 4e illustrate details of the transducer shown in FIG. 4a;

FIGS. 4f and 4g illustrate modified transducers;

FIG. 5 illustrates somewhat schematically an elevation of the card transport system in the unit shown in FIG. 1 together with several switches operated by the card;

FIG. 5a is a detailed view of the contact fingers and switches of FIG. 5;

FIG. 6 is a block diagram of the circuit and other operating elements of the unit shown in FIG. 1;

FIG. 7 is a table of the several operating states of the circuit shown in FIG. 6;

FIG. 8 illustrates a block diagram of elements for supplementing the system shown in FIG. 6; FIG. 8a is a different version for permanently recording in unit C the values of purchases made; and FIG. 9 illustrates a block diagram for a modification of the system shown in FIG. 6.

Proceeding now to the detailed description of the drawing, in FIG. 1 thereof, there is shown somewhat schematically the general layout of a system in which the invention can be used with advantage. A denotes a vending machine of any type having, for example, a number of openable compartments or buttons to be pushed so that a certain item of merchandise drops into an outlet chute or the like. For the general case it is presumed that these items do not necessarily have the same value so that different prices have to be paid for them. The respective compartments can be opened only and/or pushing of the respective button has effect only when the correct price has been paid. In general, the vending machine A may be any of the known coin-operated devices subject to the requirement that it responds to electrical signals initiating the vending operation proper (unlatching of a compartment door, etc.) The vending machine A may still be a coin-operated one with the credit card payment mode operating as an alternative. Of course, the coin operation mode may be entirely omitted from the machine A.

If the purchaser has paid a particular amount of money by means of a credit card control unit C to be described in detail below, then, for example, through the cable B a control signal is provided to the vending machine A and now the purchaser can open one of all those compartments holding an item of merchandise of that particular price. The machine A may be equipped in the usual manner with locking means, locking automatically all compartments again if one of them has been opened or if a particular button has been pressed, etc. Additionally, vending machine A will send a signal into line B to signal to unit C that the vending has been completed, for example, when a compartment door has been opened, a button pushed, etc. The control signals passing through the cable B to the vending machine A are now developed in unit C which is the subject matter proper of the present invention. Unit C appears to the purchaser as a simple box with a front panel. Of course, unit C may be structurally incorporated into the vending machine; but it is probably more economical to provide separate units for use in cooperation with different types of vending machines, or for other usages.

The front panel of unit C has a slot E through which the purchaser will insert a credit card of a type to be described more fully below with reference to FIG. 2. A decimal digit counter K has particular digits visibly displayed in the front panel. Prior to insertion of a credit card the display will, of course, show all zeros. After insertion of a credit card the counter will display the amount of credit for which the card is "good" at the moment and which is thus available to the purchaser.

The front panel of the unit C furthermore has several lamps including a lamp F which, when lighted, informs the purchaser that now he can dial into the unit C a particular amount of money which he wishes to spend. For this purpose there is provided a dial G which is of the same type as a telephone dial. Thus, a short period after having inserted the credit card into slot E, the lamp F will light up and then the purchaser will use the dial G to select the particular amount of money. More particularly, but arbitrary in principle, unit C is designed so that the purchaser will dial in beginning with the most significant digit of the dollar and cent amount.

Should, for any reason, an error occur in the operation, a lamp H will light up and inform the user of the error situation. Soon after lamp H has lighted up, the credit card will be ejected as it was inserted without any change in the information it held at that time. If no error situation is present, the new credit balance, i.e., the original credit balance minus the (smaller) dialed-in value is displayed by counter K. It is possible, however, that the user made a mistake in dialing in an amount different from the intended one, even though being a possible one and not recognized by the control unit C as an error. For this case light H is designed as button (or there may be a separate button) which when pressed provides an error-simulating signal, so that a transaction can, in fact, not take place.

If there is neither, a true error nor a simulated error due to a mistake on part of the user, a button I can be pressed by the user who has dialed in the amount of money he wishes to spend, and the purchaser can go to the vending machine A and withdraw the item he desires. This fact is signaled by the vending machine through cable B to unit C. The button I can be eliminated, and the vend buttons on the vending machine A will then perform the function. However, as was said above, and as will be elaborated below, unit C is not restricted to cooperation with a vending machine. Thus, for these cases control button I is needed to provide a command signal representing the execution of the financial transaction involved. Soon thereafter the credit card will reappear in slot E to be withdrawn by the purchaser. The card will then hold a recording of the new credit balance as previously displayed by the counter K.

Turning now to FIG. 2 there is shown in perspective and partially broken open view a credit card 10 to be used in conjunction with the vending and revenue collecting equipment. As explained more generally above, the credit card will have the usual rectangular format and size as is conventional for credit cards. There is, however, a slight difference as it is advisable to distinguish between front and rear ends as far as the two short sides of the rectangle is concerned. Therefore, the credit card 10 has a straight rear edge 11 but an arcuate or curved front edge 12. The curved end 12 is called the front end of the ticket because the user has to insert the credit card 10 into slot E of unit C (FIG. 1) with curved end 12 first.

The credit card is constructed of two outer layers 13 and 14 each made of plastic or cardboard. Either or both of these sides will bear instructions where and how to use it, advertising of the system, identification of the user, etc. The two layers 13 and 14 have sandwiched in between a magnetizable layer 15 which is thus not exposed but protected by these two layers 13 and 14. Actually the layer 15 does not have to extend over the entire size of the credit card, as only a single recording track area is used and needed for the information to be stored in this magnetic layer. The track area is identified by dotted lines and denoted with reference numeral 16.

As mentioned in the introduction the principal function of this credit card is to serve, so to speak, as an updatable letter of credit. The user of the credit card pays a particular amount of money, which for the system as presently described is presumed to be at most $99.99 For this he may obtain a card on which that amount has been recorded, or he may pay directly and have this increase in the credit balance recorded on his card in a manner to be described below. The unit C in FIG. 1 has now as its principal function to subtract from the credit card the amount of money dialed in by the purchaser and for which amount of money he withdrew merchandise from the unit A.

In the preferred form of practicing the invention the amount of money representing the credit or the present monetary value of the credit card is recorded in the layer 15 along the single track 16, and for example, in four fields arranged along the track. Each field is representative of a decade. Counting, for example, from the front end 12 of the credit card, the first field contains the tens of dollars, the next field, the unit dollars, and the last two fields, the cent value of the amount of credit at present. The number of digit fields is not important in principle, except that for reasons of safety the maximum denomination should not be too high. Four digits are used representatively throughout the specification for reasons of consistency rather than as a principle restriction.

In order to prevent misuse or forging of the information, it is advisable to use the following encoding. A decimal digit of a decade is represented by a number of pulses equal to that decimal number plus one. Thus, the decimal number zero is represented by one plus, "one" by two pulses, etc., and "nine" by 10 pulses. It is, therefore, apparent that for this code each of the four decade fields will be represented by at least one pulse. One could, therefore, say that the decimal number of each decade is represented by a like number of pulses plus a field-identifying control pulse.

While not essential for the system in principle, but in order to minimize tampering and forging of the recorded information, the fields are not recorded in particular, definite portions along the track which are preassigned to each such decade field, but two sequentially provided fields along the track are simply separated by the absence of one pulse. FIG. 3 is a representative example of a recording along the track 16 representing four fields. In the first field there is the number 1 represented by two pulses, in the second field there is a number 4 represented by five pulses, the third field has the number zero represented by one pulse and the fourth field has four pulses representing the number 3. Thus, the number recorded here is 1,403. The recording format chosen in accordance with FIG. 3 has two flux reversals per bit, which is the preferred mode as here any bit is then uniquely defined by a flux in one particular direction. A more simplified format permits denser packing of information. A bit is defined here by a flux level in either direction after a change in direction. The particular digit code of FIG. 3 is repeated in FIG. 3a for the different format.

Partially, for reasons of simplified system implementation but primarily for reasons of rendering the card tamperproof, the number recorded on the card is not the credit value itself, but it is the tens complement of each decimal digit of the dollar and cent credit balance. The recorded number 1,403 thus represents a credit balance of $96.07. This number shall be used later on repeatedly in order to explain more fully the operation of the inventive system.

The card 10, when inserted into slot E, will be automatic motion control pass a read-record head in the interior of the housing of unit C. This transporting and the control thereof will be explained more fully below. Suffice it to say that when the card 10 is being transported into the interior of the box C the track 16 is being read or reproduced. When the card is transported in the reverse direction for ejection from slot E, a new number is written or recorded on the track provided a successful vending operation without error has taken place. Details of these operations will also be described more fully below. Presently it suffices to explain the operation of the read-write head shown in FIGS. 4, 4b and 4c and the recording format used. It is not essential that the recording and reading or reproducing operation is carried out by means of the same transducer but it is a structural convenience and the particular recording system employed here lends itself to the utilization of a combined read-record transducer.

The magnetic layer 15 as protected by the layers 13 and 14 cannot be juxtaposed to any source of magnetism nor can it be juxtaposed to any sensing element. Conventional inductive type transducers could be used in principle for low recording densities, but layers 13 and 14 prohibit any high-resolution recording and reproduction with conventional transducers. However, for practical reasons the credit card will have the conventional size for credit cards which is about 3⅜ inches ×2⅛ inches or thereabouts. If one uses four information fields, then the maximum number of pulses to be recorded will be 40 so that the wavelength of a recording representing a pulse can at most be about 50 milli-inches. In order to obtain sufficient resolution the transducer gap should have a length (in direction of the data track) about half that value or less. The system as contemplated here may use a pulse wavelength (one pulse plus one pause) of about 50 milli-inches.

In view of the recording and reproducing scheme contemplated here and described below, a bit will be recorded on track 16 in that a particular region of layer 15 obtains a normal magnetization in one direction; and the bits are separated along the track by a likewise normal magnetization in the opposite direction. If a bit area is uniformly magnetized in normal direction and is too large relative to the thickness of layer 16, it will demagnetize. On the other hand, a bit area should be as large as possible in order to obtain a greater magnetic output. The dimension of a bit area in direction of extension of the track is limited due to the required bit-per-inch density, which is not much above 20. However, the track width is a free variable and thus can be chosen to obtain a bit area which produced a high flux-output. An area too large would be demagnetized to some extent and would, therefore, yield less flux-output; a rather small bit area gives less output just for reasons of smaller size. A track width of about 100 milli-inches per a structure of a few milli-inches of layer 16 was found to yield very satisfactory results.

Each layer 13 and 14 has to be at least about 10 milli-inches thick; this dimension thus defines a minimum distance between transducer and magnetic layer. The operation may become marginal for the magnetic field strength required for recording over such a distance if a conventional transducer is used; however, this mode of recording is still possible. For reproducing though a conventional inductive type transducer the system would operate at a rather undesirably low signal to noise ratio, particularly at low speeds such as 1 inch per second and below. One could make one of the layers 13 and 14 considerably thinner, but protection of the magnetizable layer would decrease accordingly. Thus, employment of a different reproducing method, and eventually, also of a different recording method is advisable.

The read-write transducer 30 shown in FIG. 4 and 4b and others defines a magnetic flux path by means of a magnetizable core 31 having two pole shoes 32 and 33 and leaving a gap 34 through which to pass the credit card 10, particularly the track portion 16 thereof. The areas of pole shoes 32 and 33 facing each other and defining gap 34 are rather small and form two edges extending in the direction transverse to the extension of track 16 in the plane of the card 10. A coil 35 on core 31 is energized during recording operation whereby current flow through the coil 35 in one direction causes pole shoes 32 and 33 respectfully to become magnetic north and south poles. The resulting magnetic field in gap 34 imparts therefore a normal magnetization of one particular direction upon a particular small portion of layer 15 in card 10. The size of the area so affected depends on the size of the areas of the pole shoes facing each other, on the speed of card 10 if in motion during the magnetization and on the duration of the flow of current through coil 35 and in that particular direction. The resulting magnetization may be representative of pauses in between data fields and pulses.

Information is presumed to be comprised of pulses in which for a particular period of time the current flow through the coil 35 is reversed so that the magnetization imparted upon layer 15 is oppositely directed, with shoe 33 then providing a magnetic north pole and shoe 32, a south pole. Within a decade field the pause in between two pulses is approximately equal to the duration of each pulse.

In FIG. 3, for example, the base line can be interpreted as establishing the basic or background magnetization. The positive pulses (bits) as illustrated each are caused by two reversals of magnetization. Each pause or gap in between two succeeding decades is represented merely by the absence of two field reversals at the regular rate. For the representation of a bit, a single flux reversal could suffice. However, the invention operates with DC reading techniques so that a pulse defined by two flux reversals can more readily be used for obtaining particular control operations such as the advance of an electromechanical counter.

Therefore, if the current through the coil 35 reverses its direction in accordance with the pulse pattern, for example, as shown in FIG. 3, a track will be recorded in layer 15 of the credit card in which each pulse is represented by a particular normal magnetization with magnetic north poles in layer 15 oriented to face layer 14, and each pause and each gap is represented by a normal magnetization in the opposite direction with magnetic north poles in layer 15 oriented to face layer 13. The magnetic field is essentially constant between the two pole shoes so that the resulting magnetization in layer 15 will not vary if the credit card 10 happens to be closer to pole shoe 32 or to pole shoe 33. It should be mentioned also that one will select preferably a magnetic field sufficiently strong to magnetize the layer 15 in track 16 at saturation.

For readout or reproducing the card passes through the same transducer 30 and the following elements are used. Two Hall effect generators respectively denoted with reference numerals 42 and 43 are included in the flux path as defined by the core 31. The core 31 may be comprised of thin sheet or wirelike elements 31a, 31b and 31c, and the flux, when crossing from one sheet to another one traverses a Hall generator. As illustrated in FIG. 4c and 4e, these Hall generators are provided with biasing electrodes connected to a read bias control lines 44a and 44b, so that current can pass through them in a particular direction which is, in effect, transverse to any magnetic field circulating in core 31 in either direction. The flux will be transverse to the plane of the drawing of FIG. 4c. A Hall generator has the material exhibiting the Hall effect packaged together with the electrodes in a block 40, and a ferrite coupler block 41 provides magnetic coupling to an external magnetic field.

The control current biases the Hall generators 42 and 43 in a particular manner. In an orthogonally arranged pickup electrode system for each of the Hall generators, a voltage is set up if the Hall generators are traversed by a magnetic field which is transverse to both, the shortest distance between the sensor electrodes and the direction of the read bias on control current passing through the Hall generators. The two Hall generators 42 and 43 are traversed by the same field and the sense electrodes are interconnected so that the Hall voltages always add. A single Hall generator suffices in principle, but two generators increase the gain of the read transducer. The operation of Hall generators is conventional and does not require elaboration.

The polarity of the voltage developed by a Hall generator for a particular read control current will depend on the direction of the magnetic field traversing the Hall generators. If the biasing electrodes of the Hall generators are connected to separate biasing sources, the sense electrodes of the Hall generators can then be connected directly in series so that their Hall voltages add. The total voltage then developed has one polarity if the magnetization traversing the gap 34 represents background or pause magnetization in track 16. For each pulse as recorded along track 16 the Hall sense voltage reverses its polarity due to the fact that the two Hall generators are connected in series. Absence of magnetization in gap 34 results in zero voltage across both Hall generators. Any inequality in distance of the credit card and in particular of the magnetic layer 15 from the two Hall generators will have little effect on the combined outputs of the Hall generators. Alternatively, a common biasing source can be used for the two Hall generators if their respective outputs control inverting and noninverting inputs of an operational amplifier 450 as shown in FIG. 4a. The signal output line of this amplifier is denoted with reference numeral 45 and in the following it will be understood that this line holds the read-output of the Hall generators, however produced.

It follows, therefore, that without physical contact and without the usual proximity required as between a magnetic recording surface and a transducer the transverse type or normal mode recordings on a track of a shielded magnetic layer are sensed by Hall generators, and they provide sufficiently strong output pulses representative of the recorded pulses and at a surprisingly low noise level. It is, furthermore, significant that this device using the particular readout technique produces output voltages which are directly representative of the magnetic information as recorded without differentiation.

One will appreciate that utilization of the pulses produced in the readout line 45 can more easily be processed if the operating position of the card (up and down) is fixed so that digital pulse representing voltages of one polarity can be used always directly for performing switching operations. The voltages of opposite polarity represent background and pulse pauses to be used for control functions. For a specific card orientation, the polarities of the output voltages have thus immediate significance. Should the card be inserted erroneously, an error situation will automatically result.

Moreover, the strength of the developed signal in the output circuit as connected to the output line 45 of the sense circuit is to a very large extent speed independent, permitting particularly low speeds of the card through gap 34, or the card may even stop. Therefore, the utilization of a phenomenon other than induction yields strong outputs even at low speeds. It is desirable to choose low speeds for the transportation of the card 10 in order to eliminate wear and tear. Unlike usual magnetic recording and reproducing, the operation does not have to be carried out in a fraction of a second; time is not of the essence.

Another significant point is that the credit card may be in a poor condition because of abusive use by its owner. It may have creases, may have been crumpled, etc. As layers 13 and 14 protect the magnetic layer the latter is not subjected to wear and tear. If the layer 15 has become uneven, it may have a variable position in gap 34 when passing through, but the recording and reproducing system employed will be little affected. If the track 16 is suitably wide, there is very little danger that the information recorded on the track of a grossly mistreated card is not discernible with this type of readout system which, as stated, will produce exceptionally low noise in principle.

FIG. 4f illustrates an alternative embodiment in which the magnetic flux path is formed by a magnetically conductive structure 46, having its two ends attached to the Hall generators 42 and 43. As the coupler blocks 41 may be of standard size such as 30 milli-inches square, pole shoes 49 may be attached to them to enlarge the sensing area, for example, to 25 by 100 milli-inches; 25 milli-inches measured in the direction of card movement for sensing signals of 50 milli-inches wavelength, and the track width is about 100 milli-inches.

The gap 34 is specifically defined by the two coupler blocks 41 of the generators or by the pole shoes 49. Two magnetic shields 47 and 48 eliminate stray flux emanating from those portions of the card not to be sensed at that instant. The shields 47 and 48 respectively have apertures into which the coupler blocks and pole shoes project. If a reproduce transducer structure as shown in FIG. 4f is used, utilization of a separate record head is advisable. Such record head can have a structure as shown in FIG. 4 with the exclusion of Hall generators.

It should be mentioned that a return flux path, i.e., a structure 46 is not essential for readout. The coupler blocks 41 when brought into sufficient proximity with the card will cause concentration of flux lines into the respective Hall generator. If there is no structure for a concentrated magnetic return path, then the flux lines will disperse on the other side of the Hall generator. However, this dispersion of the flux lines diminishes very little the concentration of flux lines into the Hall generator by coupler block 41. Moreover, it was found that an extensive magnetic return path structure couples some flux lines of the earth's magnetic field into the system. This, of course, can be compensated, but could require compensation adjustment in situ which is detrimentally economical as the entire system is actually devised with the intention that it can be installed simply by "plugging in."

While the normal recording format is preferred, longitudinal recording in the conventional way is still possible, though less satisfactory, for larger distances between layer 16 and transducer as dictated by layers 13 and 14 of the card. On the other hand, if two regular record transducers are used, one on either side of the card and with aligned gaps, then the resulting recording is still useful.

FIG. 4g illustrates a reproduce transducer to be used for reproducing longitudinal recording. The core structure 131 resembles closely that of conventional reproduce transducers except that in the flux path there is a Hall generator 42 (or several), traversed by the flux circulating in the core 131. If two such transducers are used, one on either side of the card and again having aligned gaps, the resulting output suffices. The second transducer 132 is partially shown in FIG. 4g. The Hall generators in the two transducers will then be interconnected as aforedescribed.

Proceeding now to the description of FIG. 5, there are shown somewhat schematically the elements with which the credit card 10 will cooperate after it has been inserted into slot E of unit C. There are a plurality of contact fingers 50 normally engaging a metal plate 51 and thereby establishing a closed circuit between all of the fingers 50 and plate 51. Fingers 50 and plate 51 are arranged across the width of the slot E that a card of proper size when inserted must separate all of the finers 50 from plate 51 in order to interrupt that circuit. The mechanism provided for transporting an inserted card will not be energized, unless all fingers 50 have been separated from plate 51.

The card 10 should be pushed into slot E with rounded portion 12 in front. Therefore, there are provided two switches 52 and 53 having feeler arms positioned to sense correct insertion of a card. Switch 52 has its feeler arm positioned along the path of the central portion of the card 10. (See FIG. 5a) Switch 53 is aligned with switch 52 across the path of card insertion but laterally displaced therefrom, to be still in the path of an inserted credit card but more close to one of its long sides. Therefore, upon insertion of card 10 with the front end first there will arise the situation in which switch 52 is closed while switch 53 is not closed (FIG. 5a). An operating condition for initiating further transportation of the card by automatic means is established when switch 53 is still open while switch 52 has been closed.

Of course, the travel path of insertion for card 10 should be restricted by walls (not shown) so that the card must be inserted straight so that a tilted rear end 11 of the card cannot simulate arcuate front end 12. The importance of correct insertion is readily understood if one realizes that the data fields along the track 16 have different digital significance so that the order of presentation of the data fields must relate to their significance, and that order depends on the particular position of the card as inserted. Of course, one could use a second track on the card bearing codes denoting the significance of the data fields. Alternatively, the single track may have a "beginning-of-record" type recording code to identify the correct end with which the card has to be inserted first. Failure of that code to be read first would then result in automatic card ejection as explained more fully below. It is, however, apparent that the simpler and therefore preferred method is to have the unit respond electromechanically to a particular card shape and position.

Correct insertion of a proper card, therefore, causes all fingers 50 to separate from plate 51, switch 52 is closed but switch 53 is open. The card may be inserted manually further so that switch 53 closes also, but a temporary state of switch 53 open—switch 53 closed is necessary and sufficient to start a motor 55 to run in forward direction. A pair of rollers 56 driven through a belt 57 by the motor 55 will now grip the card and advance the same.

Immediately in front of transducer 30 there is provided the feeler of a limit switch 58 which is closed by the front edge of the credit card and remains closed until the card has passed. This meters particularly the period during which track 16 enters and passes through the gap 34 of the transducer 30. The closing of the switch 58 will cause the transducer 30 to be operated in the read-reproduce mode to read the content of the track 16. The card continues to be advanced until the front end hits the feeler arm of a switch 59 which operates to cause the motor 55 to a stop. A leaf spring 60 insures that the card comes gently to a stop. The switch 59, is of course, sufficiently far from the transducer 30, so that upon abutment of the front end 12 of the card at spring 60 the rear end 11 of the card has cleared the transducer 30. Moreover, the rear end 11 of the card must have also cleared the switch feeler arm of a switch 61 which was also closed during advance of the card but because the switch 58 closed first the subsequent closing of switch 61 will be ineffective as will be described more fully below.

After certain operations have been performed, also to be described more fully below, the card will have to be transported out again for which purpose the motor 55 is being started in the opposite direction. The return of the card causes the switch 61 to close before closing of switch 58, which means that the transducer 30 will be operated in the record mode provided other conditions are fulfilled. During the reverse transportation of the card out of the slot, new information will be recorded onto the track 16, if the return of the card is not caused by an error situation. The motor 55 will run in that direction until the switch 53 has closed and opened again which places the system back into the rest position, and the card will project sufficiently out of slot E so that it can be withdrawn.

We proceed now to the description of the circuit system which processes the reproduced data, controls the establishing of a new credit balance, controls the vending operation, and causes recording of the new credit balance on the card. The system as shown in block diagram in FIG. 6 is designed and constructed in a manner that at any time it is in one of ten possible operating states. The system will be described in the following by explaining in sequence these ten operating states.

The states are identified by state signals S1 through S10 provided by a state counter 70 which may be comprised of four flip-flops. Unit 70 is not a real counter except that it is convenient to interpret the altogether 16 different state combinations of the four flip-flops as numbers. Unit 70 includes a decoder having 10 output channels or lines respectively energized if the four flip-flops are in states representative of one of the counter numbers. The table in FIG. 7 shows these 10 states as identified by the four flip-flops constituting the state counter 70, and one can see that normally when the system shifts from state to state in the given sequence only one flip-flop at a time is being changed. Moreover, the state number code is cyclic so that the counter can shift from state S10 to S1 by change of state of but one flip-flop. Actually nine different states suffice for the principle unit, but for a cyclic code and a change of state of but one flip-flop for a change of state of the counter in the regular sequence, one needs an even number of states. The state counter 70 has an input logic 71 which processes the several input signals it receives in order to establish the several states. The input logic 71 includes appropriate circuitry for feeding the required input signals to set or reset input sides of the flip-flop constituting the state counter 70. Details thereof do not require elaboration and follows normal AND/OR gating procedure. The signals used for controlling the state counter will be developed throughout the following description.

State S1 is the "idle" state identified by a reset state for all state counter flip-flops. In this state everything is at rest. It is assumed that as soon as power is applied to the entire unit state S1 is established. Power does not have to be provided continuously to unit C, as the front panel of unit C may be provided, for example, with a pushbutton or switch, required to be pushed to render unit C operative by turning power on. Now it is presumed that a credit card is inserted in slot E. The input logic 71 responds to a complete opening of all the contacts 50, 51 and opening of switch 52 while switch 53 is still closed, as was explained above. This combination of switching states signals circuit 71 that a credit card of correct dimensions has been inserted into slot E properly, curved front end first. Gating circuitry in input circuit 71 switches the state counter 70 from S1 to state S2, which is the "motor forward start" state.

As illustrated symbolically, state signal S2 causes operation of a switch 63 which turns on one of the two energization circuits of a reversible motor 55 to run in one particular direction. The motor control circuit is designed so that the motor is simply turned on to run in that direction upon temporary presence of state signal S2. The motor will not be turned off by mere removal of state signal S2, as this and other state signals operate in the motor circuit as switching signals only. For turning motor 55 off, a different switching signal is needed.

As the card is advanced by motor 55, the front edge of the card soon reaches and closes switch 58. For establishing the next operate state, state S3, it is furthermore, required that switch 58 is closed while switch 61 is open and that the system is in state S2. Upon monitoring this coincidence the input logic 71 will control the state counter to assume state S3, which is the read or reproduce state. State signal S3 controls transducer 30 to operate in the read or reproduce mode. State signal S3 turns on the read control current for appropriately biasing the Hall generators in the read transducer, in that a switch 65 operated by state signal S3 connects biasing source 44 to the read transducer provided a combined read-write transducer is used. If separate transducers for reading and for writing are used, the read transducer can then be enabled permanently; switch 65 can be omitted and source 44 be connected permanently to the Hall generators. In addition, state signal S3 operates a switch 66 to enable the output line 45 connected to the Hall generators in the transducer 30 as was explained above with reference to FIGS. 4a and 4c.

The pulses as read from the data track on the card will be passed through the line 45. The readout circuit will produce bit-defining pulses if each bit is defined on the card by two flux reversals (see FIG. 3). If a format as shown in FIG. 3c is used, the readout circuit may include two threshold detectors, one for each flux direction, and respectively responding to output voltages somewhat below maximum in either direction. The two threshold detectors each trigger a monovibrator providing the bit-defining pulses into readout line 45. However, as the recording format of FIG. 3 is preferred, the output pulses of the Hall generators are directly usable for further processing.

The first pulse will be blocked by a gate 72 but will cause a normally reset flip-flop 73 to be set. When the flip-flop 73 is set, gate 72 opens for the next pulse and this and the following pulses read by transducer 30 pass through an OR configuration 74 into an input logic 75. At some place in signal line 45, before or after gating, there may be one or several amplifiers to boost the power level of the reproduced signal in a conventional manner.

The input logic 75 pertains to an input counter 750 comprised of four individual decade counters 76, 77, 78 and 79. The pulses from the OR-gate 74 which presently are the pulses read from the first decade field in track 16 of the credit card, except the suppressed first pulse represent the least significant decade and are passed by the input logic 75 into the least significant decade counter 76 to the exclusion of the other input counters. The circuit 75 has been prepared for this operation by a field counter 80 which is presumed to be in count state "0," which is its normal state. Field counter 80 has at that time not received any additional pulses to change its state. The input logic 75 is, therefore, designed so that for the operational state S3 at count state "0" of field counter 80 the pulses permitted to pass through the gates 72 and 74 are set into the counter 76.

The counter 76 may simply be a mechanical pulse counter which shifts from count state to count state for each input pulse it receives. As the card moves relatively slow, the pulses follow at a slow sequence (low input frequency), at a rate in the order of a few cps, so that fast operating electronic counters are not needed, though they could, of course, be employed. Counters 76 to 79 are presumed to be forward-counting, decadic, recycling counters. The maximum number of pulses in a data field, in addition to the suppressed field control pulse and before a gap is nine, so that the counter 76 will not recycle and may reach count state nine at the most. Should, however, counter 76 be recycled, an error situation is present. each counter has an output line, respectively 769, 779, 789 and 799, and receiving a pulse when the respective counter recycles, i.e., shifts from count state "9" to count state "zero." Each counter has an output line, respectively 760, 770, 780 and 790, receiving and holding a signal when and as long as the respective counter is in count state "zero." The lines 769, 779, 789 and 799 are respectively AND-gated with the count state signals "0," "1," "2" and "3" from field counter 80 in output logic 751, and the four AND-gated outputs are OR-gated into a line 752.

If, during operating state S3, line 769 receives a pulse (or any of the other lines 779, 789 or 799) an error monitor circuit 83 responds to the signal in line 752. Circuit 83 responds specifically now to coincidence of the state signal S3 and of any signal in any of the lines 769, ..., 799 as appearing in line 752 to set an error flip-flop 81. Flip-flop 81 controls lamp H in the front panel of unit C and lamp H will light up when flip-flop 81 is set. The system could be operated in a manner that as soon as flip-flop 81 responds, motor 55 is stopped and reversed. However, a simpler sequence has been adopted here so that in an error situation during state S3 lamp H lights up and otherwise S3 is completed normally. One can readily see also that an incorrect insertion of the card will produce error. When the card is inserted upside down, then the polarities of signals in line 45 are reversed. Gaps and pulse pauses are then counted as pulses, and very likely (but not necessarily) more than 10 such pulses will result. However, incorrect insertion of the card will be detected with certainty at the end of the card reading operation. Returning to the counting of pulses of the first decade field and assuming that an error situation is not present, nine or less pulses have been received by the counter 76. At the end of the first, least significant decade field a gap will occur (see FIG. 3) The line 45 as enabled by the state signal S3 is additionally connected to a gap detector 82. The gap detector will be triggered with each pulse but is also reset and triggered again if the pulses occur in a regular sequence within a decade field during this readout operation. However, at the end of a field which is marked by a missing pulse prior to the beginning of the next field the gap detector 82 will respond. Gap detector 82 will conventionally be a reset integrator combined with a Schmitt trigger shifting to the triggered state only when a pulse pause exceeds a value in excess of the regular pause between pulses of a data field.

The output of detector 82 is used twofold. First, gap detector 82 advances the field counter 80, second it resets the flip-flop 73 to close gate 72. As now the pulses from the second field arrive, the first one thereof is again being suppressed by gate 72 until flip-flop 73 is set. The second pulse of the field, if there is such a pulse, will be passed through gates 72 and 74 into the input logic 75. The field counter 80 is now in the count state "1" and the logic 75, therefore, directs the pulses permitted to enter logic 75 into counter 77 for the second decade. The operation proceeds now from field to field. For each gap, gap detector 82 advances the field counter 80, and the field counter 80 in cooperation with the input logic 75 distributes the reproduced pulses of each field, with the exception of one pulse per field, sequentially into the several counters.

Taking the numerical example from FIG. 3 at the end of the reproduction, counter 76 will be at count state 3, counter 77 at count state "0," i.e., the single pulse of the second field is being suppressed, and it was succeeded immediately by a gap. The third field had five pulses so that counter 78 is in the count state 4 and the last field has two pulses so that counter 79 is in count state "1." It is arbitrary in principle if one designs the system so that the most significant decade is recorded to be read first or last, but for reasons of "tamperproofing" the system, it is preferred to have the data recorded that the most significant decade is found next to edge 11 and is read last.

A gap again must occur after the fourth field and counter 80 shifts accordingly back to count state "0." Thereafter, there should be no more pulses in the signal line 45 for readout. If there are, then there is a fifth field which represents an error situation. These pulses from the fifth field will be set again into counter 76 as this is the one receiving pulses for count state "0" of field counter 80. This may produce an overflow signal into line 769 and in state S3 this is, per se, an error situation, which will be signaled accordingly. If no overflow results the error resulting from presence of a fifth field is detected later as will be described shortly.

The total time for reading time is prima facie indefinite because the total length of the recorded track due to the packing of the recording is indefinite and not foreseeable. The total readout period is definitely shorter than the total length of the track 16. This, however, concerns only the beginning of reading, the end follows shortly after the last decade field has been read, as that holds the most significant decade, disposed next to the edge 11 which is the trailing one during reading. Shortly after the reading operation has been completed and in the absence of error, no more pulses are being read by the head 30, until the front edge 12 of the credit card hits switch 59.

Closing of switch 59, while the system is in state S3, causes input logic 71 to respond and to shift state counter 70 into the "motor stop" state S4. The state signal S4 is used as switching signal in motor control circuit for opening the switch 63; motor 55 therefore comes at rest. The input circuit 83 for the error flip-flop 81 is designed to monitor the existence of the state signal S4 when field counter 80 is or is not at count state "zero." If the field counter 80 is not at count state "zero" after the card has been read and the motor is stopped, an error situation is present and flip-flop 81 is set. There always must be four decade fields, no more and no less. If there were only three, counter 80 is in state "3" at the end of reading; if there were five fields then field counter 80 recycled and is in count state "1" after the fifth gap. In either case, the credit card has been tampered with, for example, by "filling" one of the gaps with a simulated pulse, thus eliminating one of the gaps, or by adding pulses and generating another field. Therefore, in this case again error lamp H will light up.

One can see that this operation includes also detection of an incorrect insertion of the up and down sides of a card. The gap detector 82 responds to an output voltage in line 45 having a particular polarity and a particular minimum duration. When incorrectly inserted, a single field will be counted at the end of reading as during reading there never occurs a readout voltage of gap duration and polarity, as one can verify by interpreting the pulses in FIG. 3 as pauses.

The operational state S4 is not merely provided for stopping the motor, but its primary function is the transfer of the tens complement of the data held in counter 750 into the display counter K. For this operation to be performed in orderly sequence, it is required that field counter 80 is in count state "zero" at the beginning. This will be the case if there were no errors in the previous operations. If there were, the error flip-flop 81 is set and its set state is used to provide a reset signal into a command line 84 to reset field counter 80 to zero. The existence of an error does not means that everything stops, but it merely changes the sequence and conduction of some of the operating steps. Since, however, one of the "byproducts" of operating state S4 is the return of all counters 750 into the count state "zero," i.e., a complete resetting of the counter, such operation must be carried out regardless of whether or not there has been an error.

As field counter 80 is again in count state "0" the state signal S4 closes a switch 86 in the output line of a clock pulse source 85, and clock pulses from source 85 are passed through OR-gate 74 into the input logic 75. Switch 66 opened upon removal of state signal S3, switch 66 could thus be a regular gate. As explained earlier, for count state "0" of the field counter 80 logic circuit 75 directs the pulses it receives into the first decade counter which is 76. The counter 76 holds a number which was read into it from the first data field on the record card. In the example shown in FIG. 3 it was presumed that this was number 3. Additional pulses, now from clock 85 are set into counter 76 to count up until reaching count state "zero" which will be after seven pulses.

This operation of incrementation of counter 76 is reflected into one of a second set of counters which are counters 91, 92, 93 and 94, which constitute display counter K. Counter K has an input logic 95 for clock pulses, which are the same as the ones fed from source 85 into logic 75. This, however, is done only if a gate 87 is not blocked from a set-state output of error flip-flop 81. In case of error, clock pulses do not flow into logic 95. The input logic 95 is, in addition, also under control of the field counter 80 and in the same manner as is logic 75. Thus, in count state "0" of field counter 80, the pulses derived from clock pulse source 85 are set also into the first decade of display counter K which is 91. The number of pulses set into counter 91 is the number of pulses necessary to increment counter 76 to count state "zero" again. Therefore, it is the complement of the number held in counter 76 which is being set into counter 91.

As counter 76 recycles towards count state "zero" a signal appears in line 769. In operate state S4 such signal is not an error situation. Output logic 751 responds to that signal and to the count state "zero" signal from field counter 80 to pass the resulting signal into line 752 and to field counter 80 as an alternative clock or count input pulse for advancing the field counter 80, now to the count state "1." Counter 76 thus ceases to receive further pulses and so does counter 91 holding the tens complement of the number that was set into counter 76 in the read state. The input logic 75 will now begin to distribute the clock pulses from source 85 into counter 77. Analogously the input logic 95 will distribute the same number of clock pulses into counter 92 and until counter 77 recycles to zero sending a pulse into line 779. The logic 751 responds to this recycling causing again field counter 80 to advance now to count state "2," etc.

One can see now that one by one the counters 76, 77, 78 and 79 are recycled to zero and the tens complement of each digit held in the respective counters is set into the counters 91, 92, 93 and 94 respectively. Looking at the example shown in FIG. 3, the counters 91 to 94 constituting display counter K will show respectively digits 7, 0, 6 and 9 at the end of the operation. These digits represent $96.07, a credit balance as it was recorded on the card by the complement code. This number will be displayed by display counter K. The completion of this operation is present when all counters 76 through 79 are, in fact, at count state "zero". This state of counter 750 is monitored by an AND-gate 700 connected to the lines 760, 770, 780 and 790. An output signal of gate 700 marks the end of state S4.

The progression of operate states will now depend on the state of error flip-flop 81. If it is set due to occurrence of any of the error situations previously discussed, then coincidence of state signal S4, or signals in all four output lines 760, 770, 780 and 790 as monitored by AND-gate 700, and of the set state of flip-flop 81 causes input logic 71 to shift state counter 70 to state S8. Looking at the table of FIG. 7, one can see that this involves the reversion of all states of the flip-flops of the state counter 70. As will be explained more fully below, state signal S8 causes motor 55 to eject the card, and without any change in the recording therein if concurring with the set state of error flip-flop 81.

If flip-flop 81 is reset when all counters 76 to 79 are reset to zero, then input logic 71 responds to that condition to terminate state S4 and to advance state counter 70 to operational state S5. State signal S5 is used to cause the lighting of the lamp F in the front panel of unit C to signal to the person who inserted the credit card into slot E that he can now dial in the value of the desired purchase. Lamp F also signals completion of operation of display counter K informing the user as to its present credit.

During operational state S5 the user can dial into the system the amount of money he wishes to spend. The dial G is provided for this purpose as was outlined above. The dial G is a regular telephone dial and, therefore, upon selection of one particular number it will provide a like number of pulses. In a manner which is analogous to the dialing of a telephone number sequential decades are represented by sequential pulse groups. The output line for this dial is noted with reference character 96 which is under control of a switch 97 operated by state signal S5.

It will be recalled that field counter 80, in general, cooperates with circuits 75 and 95 to enable counters 750 and K in the order from least to most significant decade for ascending count states of field counter 80. Now, for the dialing in of a number, it must be realized that the more conventional way of providing any manifestation of a particular amount of money is from the highest denomination used down to the least significant digit (for example, cents) in that sequence. Therefore, the state signal S5 may be used to reconnect field counter 80 to operate as ascending counter. Moreover, a pulse train for operating field counter 80 is needed and for state S5 this will be zero state of dial G, sending a signal into line 98, enabled also in response to state signal S5. Thus, as state S5 is established counter 80 is internally reconnected for descending counting, but also the dial G is still at zero, so that a count pulse issues into line 98 upon closing of switch 97a and field counter 80 thus shifts to count state "3," so that logic 75 prepares the most significant digit counter 79 of counter 750 for receiving pulses.

The user will soon dial and the input pulse group passes through line 97, gate 74, logic 75 into counter 79. When dial G resets to zero field counter 80 shifts to count state "2." The next pulse group from dial G will be distributed by the input logic 75 into the counter 78 and so forth, until the four pulse groups have been respectively loaded into counters 79, 78, 77 and 76, in that order. If the amount is under ten dollars, then the first digit dialed must be a zero. If the amount is under one dollar, two zeros must be dialed in first. There always must be four digits dialed into the unit C. In cases the control unit may be used for cooperation with a vending machine where the items of merchandise all have the same price, such as a vending machine for coffee, soft drinks, candy, cigarettes, etc. In this case, the dial G can be omitted and an additional button, when pressed, simply sets by ratchet action the position of counters 76 to 79 to that amount.

The dial-in is completed when either one of the following two coincidences occurs: counter 76 in nonzero state when after the last zero pulse from dial G field counter 80 recycles to count state "3". However, this is true only if there is a nonzero cent amount. For the alternative case, one has to observe that dialing in of a zero digit produces 10 pulses. Thus, placing "zero" into counter 76 causes full recycling thereof so that before completion of recycling a pulse is sent into line 769. (Similar pulses may have occurred during dial-in in the other lines, 779, 789 or 799, but they are not used in state S5.) Therefore, the dial-in is completed when counter 76 is in nonzero state for count state "3" of field counter, or by a signal in line 769 at count state "0" of field counter 80. The input logic 71 will respond accordingly to either signal combination to shift the state counter 70 now to the "arithmetic" state S6.

It should be mentioned that this distinction can be made in this manner only when the dial is a regular telephone dial. Alternatively a dial with "0" in the first position can be used, producing no pulse in output line 97 from the dial. Resetting of the dial does, however, result always in a pulse for line 98 to decrement counter 80. State S5 can be terminated if this alternative type be used in that the inverted output of gate 700 is used in count state "2" of field counter 80 to prepare logic 71 and when the dial produces the last pulse for line 98 state S5 is terminated to shift state counter 70 to state S6. This mode of state change is applicable also if the regular telephone dial is used and is based on the assumption that as soon as a nonzero value is dialed into the system gate 700 turns false.

As soon as state S6 is entered into, field counter 80 is rearranged for ascending counting and it is set to count state zero. During state S6 the dialed-in amount is subtracted from the present credit balance, in that the ten-thousands complement of the dialed-in number is added to the credit balance held as number in display counter K.

The state S6 signal causes closing of switch 86 in the output line of clock 85 to pass clock pulses to the input logics 75 and 95. The formation of the ten-thousand complement requires that the number of pulses for upcycling counters 92, 93, 94 must be reduced by one in comparison with the number of pulses respectively required to recycle counters 77, 78, 79 to zero. On the other hand, counters 91 to 94 now already hold a number, namely the current credit balance, so that an addition to a number is any of the counters 91, 92 and 93 may produce a carry requiring an additional pulse for the counter of the respective next decade. Thus, there is provided a carry flip-flop 100 which is set when respectively operating one of the counters 76 to 78 recycle to zero and reset when counters 91 to 94 respectively recycle to zero. This is the logic requirement, but for the implementation it has to be observed, that by definition of the operation, the respective operating one of counters 750 always recycles through zero, which terminates operation for the particular decade, while the respective operating one of counters K may or may not recycle through zero and if recycling through zero, then never later but normally earlier than the respective operating one of counters 750. The control of carry flip-flop 100 must, therefore, consider that occurrence or nonoccurrence of a carry in counter K is the variable, while the possibly later occurrence of a borrow (recycling of counter 750) occurs always and must not interfere with prior occurrence of a carry in counter K. Before describing the control of carry flip-flop 100, the control exerted by the carry flip-flop 100 shall be described first.

As counters 76 to 78 respectively return to zero, a decision has to be made whether the next decade counter of counter K receives one pulse less or not, and that is determined by the state of the carry flip-flop 100. After a counter 76 to 78 respectively has reached zero, counter 80 is incremented through a pulse in line 752 as before. The next clock pulse will then go into the next decade counter of counters K if carry flip-flop is reset. If not, output logic 101 of carry flip-flop provides a blocking signal to a normally open gate 88 to inhibit one pulse, which otherwise would pass into the next decade counter of counters K. The same clock pulse is, however, passed into the corresponding decade of counters 750. Thus, if carry flip-flop 100 is set, blocking occurs due to the requirement of forming the ten-thousands complement of the dialed-in number. If flip-flop 100 is reset at the beginning of operating a new decade, blocking does not occur as the borrow for forming the ten-thousands complement and a carry for the adding operation cancel.

Turning now to the control of carry flip-flop 100 the input logic 102 thereof includes a control flip-flop which is set by each pulse in line 752, i.e., concurrently with each incrementation of counter 80; the control flip-flop is reset by the next clock pulse. The change from set to reset state of that control flip-flop is used to set carry flip-flop 100. The carry flip-flop 100 is reset directly through signals from an output logic 99 which is similar to logic 751. Logic 99 responds to recycling through zero of the respective operating one of the display counters K, through an AND-OR configuration as illustrated. Logic 99 provides a signal only if during the current operation the respective counter of display counter K cycles through zero. The ten-thousands complement of the dialed-in number should, in fact, be larger than the credit balance number held initially in the counters 91 through 94, as the dialed-in amount should be smaller than the credit balance. If not, then the user obviously attempts to be smaller than the credit more than his credit permits. It follows, therefore, that at the completion of this adding operation the number held in the counters 91 through 94 will be equal to the old credit balance minus the dialed-in value (which equals the new credit balance) plus 10,000, which is represented by a carry bit in the flip-flop 100, it will be in the reset state.

If the credit balance was smaller than the dialed-in number, the total number held in the counters 91 through 94 will be smaller than 10,000, which fact is represented by absence of a carry bit, i.e., counter 94 for the most significant decade did not pass through zero. The operation, of course, is completed in any event by counters 76 through 79 having been reset to zero again. The coincidence of all counters 76 through 79 being at count state zero is monitored by gate 700. A carry bit in flip-flop 100, i.e., the reset state thereof, marks the successful completion of the operation and can, therefore, be regarded as a condition causing input logic 71 to shift to state S7. If, during the state S6, all counters 76 through 79 have been recycled to zero and there is not a carry bit in flip-flop 100, then the dialed-in number was larger than the original credit balance. Hence, a signal from gate 700 coupled with the set state of flip-flop 100 is regarded as an error situation and produces in logic 83 a signal for setting flip-flop 81 and error light H goes on.

State signal S6 plus set state of error flip-flop 81 can be used as a condition to control input logic 71 to shift the state counter 70 into the state S8 which, as was described above, causes motor 55 to be started. The card is ejected without changing anything thereon, and the system recycles to the idle state as will be described. Presently it suffices to say that the operation sequence has, in effect, been aborted, permitting, however, to start anew by reinserting the card and correct dialing.

Assuming that the credit balance was larger than the dialed-in value so that the arithmetic operation was completed successfully with a carry bit in flip-flop 100, then logic 71 will respond to an all-zero state of counters 76 to 79, zero state of counter 80 and reset state of error flip-flop 81 to shift the system to "vend" state S7. However, the user should have a chance to observe the new credit balance as displayed by counter K before making the purchase. Also, he may have made a mistake and wishes to cancel the initiated transaction before completion. Therefore, state 7 may be merely a waiting state requiring specific control signals to become effective, or during which time the user is given a "last chance" to cancel the transaction. If he wishes to do so he will press lamp button H and simulate an error. Flip-flop 81 will be set, or flip-flop 100 could set, there are different possibilities available. In any event logic 71 will respond to the simulated error in state S7 and cause shifting of the system to state S8 which in conjunction with the set state of error flip-flop 100 initiates ejection of the card without changing the recording thereon.

If the unit C is not coupled to a vending machine but merely used in an attended environment for acceptance of payment, button I can now be pushed which completes the transaction, in that automatically the card will be ejected and the new, diminished credit balance will be recorded as will be described below. If the unit C cooperates with a vending machine, and if control button I is not the vend button operating the vending machine, state signal S7 can be used as a command signal to whatever process is to be controlled. Referring to the description of FIG. 1 it is this signal which will pass through the cable B, for example, to vending unit A, permitting, for example, opening of those compartments holding merchandise of the dialed-in value, or the signal S7 enables the vend buttons in vending machine A, or button I may be the vend button and signal S7 with button I pressed commands the vending operation.

As one can see from the input circuit for the logic 71, the cable B will have a second line through which unit A signals to unit C, presently described, the completion of the vending operation. That signal, for example, may be produced when the purchaser opens a compartment for removal of merchandise, or presses a button for actuating a dispensing mechanism, etc., or has pressed button I. In either case, the "vend completed" signal shifts the system now into the "motor reverse" state S8. As was briefly described above, state signal S8 operates switch 64 to turn motor 55 on to rotate in a direction so that the conveyor system will move the card towards the slot E. Soon the now rear edge of the card will close the switch 61 while switch 58 is open.

This combination of states of switches 58 and 61 together with state signal S8 operates logic 71 to shift the system to the write state S9. Writing, however, can occur only when flip-flop 81 is reset. This makes the distinction over the error situation or simulated error situation when the transaction is cancelled before completed. Actual writing will not occur if error flip-flop 81 is in the set state during operate state S9, regardless when it was set and for which one of the reasons mentioned above. Signal 81 identifying the reset state of error flip-flop 81 in write state S9 enables a control gate 36 to pass current to write control line 35 in one or the other directions for recording as was outlined above. In case error flip-flop 81 is set, the system will still be in the write state S9, but no writing will occur. However, counter K will be recycled to zero in either case.

The write or record operation requires recording of the tens complement, individually for each number held in the counters 91 through 94. Specifically, the operation requires the upcycling of each counter 91 to 94 individually, beginning with the one (94) holding the most significant digit. Each such recycling produces a number of pulses (or not) to which one pulse and one pulse-pause must be added to establish the recording format and separation of data fields on the recording track of card 10. The field counter 80 is thus operated by state signal S9 to operate as reverse counter, and the state signal itself places counter 80 into count state "3." State signal S9 also closes switch 86 but blocks logic 75.

The input logic 95 is controlled by field counter 80 and distributes clock pulses from the source 85 into the decade counters 94, 93, 92 and 91, in that sequence, for upcycling the counters individually to zero. The zero state of each such counter, when attained, causes the field counter 80 to be decremented, by 1, but not directly. The distributing logic 95 shifts the distribution of the clock pulses to the next lower decade of counter K, only after the field control pulse and a pause have been recorded. In addition, of course, clock pulses are passed from the source 85 through the write gate 36 to the transducer head 30 to operate now in the record mode.

A control toggle flip-flop 37 is enabled if the respectively operating one of counters 91 to 94 has reached zero, which is an output signal of logic 99. The next clock pulse from source 85 will then set the flip-flop 37, the one thereafter will reset the flip-flop. The set state of flip-flop 37 is monitored by a gate 38. The output of gate 38 when true blocks the gate 36 for one pulse period and serves as actual counter operating pulse for field counter 80. Hence, one additional pulse per field is recorded, the next one thereafter is suppressed, and thereafter again the next lower decade counter of counters K is upcycled.

The write state S9 can be terminated in two ways, for example, it can be terminated when the counters 91 through 94 are all at count state zero or it could be terminated when the rear edge of the card closes switch 52 at a time the system is in the operating state S9. The logic 71 is designed accordingly to shift the system to state S10; write current is turned off and the read-write head 30 becomes disabled (if it was enabled). The state S10 does not cause any specific operation and is terminated when the now trailing front edge 12 of the card clears the switch S2 again. Thereupon the system shifts into state S1, which state signal is used to trigger opening of switch 64 to turn off the current to motor 55. The motor is now at rest and the card can be withdrawn. All counters are at zero and the unit C can be operated again.

The system is easily adaptable to the following situation, explained best with reference to FIG. 8. The system shown partially in FIG. 8 includes all elements of FIG. 6, and additional elements are shown in cooperation with elements previously described. The cards may be universal, issued, for example, by banks, for a price, without specific affiliation. The vending machines or commercial establishments having credit control units essentially as described may pertain to different economic enterprises. In this case, the control unit has to be equipped with an accumulate counter 761, adding all dialed-in numbers which led to a completed transaction evidenced by the recording of a new credit balance. A duplicate counter group 760 of the type of counters 76 to 79 is needed to receive also the (complement of the) current credit balance as reproduced and set into counter 750. This duplicate counter 760 is not, however, affected by the dial-in process, nor is its content transferred into the display counter K.

As display counter K is emptied during state S9 for recording of the tens complement of the new credit balance, the emptying process can be used to set the ten-thousands complement of the new credit balance into the accumulation counter 761. There may or may not result a borrow bit which is temporarily stored. A distribution logic 763 for counter 761 is constructed and controlled analogously to the circuitry described above for transfer of the ten-thousands complement from counter 750 to counter K during state S6, for subtracting. Thereafter, for example, during the otherwise not used state S10, the tens complement of the number held in the duplicate counter 760, which complement is the previous credit balance, is set also into the accumulating counter 761. For this purpose distributor logic 75 can be controlled as in state S3 except that counter 750 is not affected, only counter 760 is. Concurrently distributor logic 763 and field counter 80 are controlled analogous to the transfer between counters 750 and K during adding, which will be described later. The possibly resulting carry bit increments a fifth decade in counter 761, if there was no borrow bit. Neither process takes place in the case of error. In the absence of error, accumulating counter 761 receives actually the difference between old and new credit balance, which is the dialed-in value of a successfully completed transaction. A different version for permanently recording in unit C the values of purchases made is depicted in FIG. 8a. The additional counter 760 is provided as in FIG. 8, except that it is operated only during dial-in, concurrently with counter 750 during state S5. However, counter 760 is not emptied during state S6 (as is counter 750), but maintains the dialed-in value at least until state S9, with error flip-flop 81 in the reset state, i.e., when it is certain that the vend was completed and that a new credit balance is, in fact, recorded on the card. Counter 760 for this case is provided with stenciled numbers so that the dialed-in value can be printed. As state S9 is entered into, a switch 771 closes and energizes a solenoid 772 operating a platen 773 to urge a portion of a strip of paper 774 against the counter 760 to obtain a printout. The paper 774 can be reeled from a payout roll 775 to be wound on a takeup roll 776 driven by a step-drive 777. For example, state S10 can be used to operate step-drive 777 to advance the takeup roll pulling paper 774 by one step. Plate 773 is released as soon as state S9 is terminated. Printing of each credit item individually as dialed in obviates the necessity for an accumulation counter in the unit. Of course, alternatively to printing, one could punch or magnetically record the dialed-in values on appropriate tapes or the like.

The system, as described, is described for use as a control unit for a vending machine or for accepting payment in the described manner for goods or services tendered directly and personally, i.e., without use of a vending machine. It is, however, possible to adapt the unit in a very simple manner for establishing an increased credit balance on the card. With this simple modification units of this type may, for example, be installed in banks, drugstores, gas stations, or wherever there is a possibility for a person to make payments. Then, upon making such payments, the attendant can use the unit to dial in that number, to be added to the credit balance. Other uses of the adding mode will be described below.

For this, there is provided a switch 110, which may be available in the front panel of such a modified unit or it may be inside of control unit C for access only through a key, etc. That switch 110 is shown in the drawing in a position for vending operation as connecting the output of the dial unit G to the line 96 which feeds dialed pulses to counter 750 so that the ten thousand complement thereof can be added to the content of the counters 91 through 94 for providing subtraction of the dialed-in value from the credit balance, pursuant to the operate steps as aforedescribed.

For adding switch 110 is placed into the alternative position. The card is inserted as aforedescribed and the operation is the same for states S1, S2, S3 and S4, also as aforedescribed, resulting in the setting of the credit balance on the card into the display counters 91 through 94. That value may be zero or it may be a small value and the user and owner of the card may want to increment it up to the maximum value of $99.99 or to a lesser value, whatever he wants to add to his credit balance. The state S5 is established also as aforedescribed, with lamp F lighting for signaling that now the desired value can be dialed in. As switch 110 is in the alternative position, the system shifts immediately to state S6, and the dialed-in value is not set into the counter 76 or 79 but directly into the input logic 95. Logic 75 is blocked by the alternative positions of switch 110. The field counter 80 is operated from the dial unit G, (as before in state S5) but as forward counter in state S6. With each completed zero setting of the dial field counter 80 is incremented by 1. The dialing should, however, be carried out here by beginning with the least significant digit, as otherwise the carry operation would require extensive additional circuitry. The input logic 95 distributes the dialed-in values into counters 91 through 94 whereby the recycling of one of the display counters through zero does not operate the field counter 80 but provides, through flip-flop 100, a carry bit to the respective next decade counter.

After completion of the dialing with the field counter 80 being again in count state "0," it is now clear that the value held in the counters 91 through 94 must not exceed a four-digit number value. Therefore, if for this adding operation a carry bit is produced by the counter 94, i.e., if that decade counter has recycled through zero during this adding operation, then actually more has been added than should have been. The number should not have exceeded 10,000 because the dollar value that can be recorded on the card must be below $100.00. Therefore, the end of state S6 with the switch 110 in the "add" position there should not be a carry bit in flip-flop 100. If there is, an error situation is present, i.e., a carry bit in flip-flop 100 at operational state S6 signals an error situation. Error flip-flop 81 is set and the card will be ejected without recording the new balance into the unit. The old balance will remain and the user has an opportunity to insert the card anew and then to dial into the unit another value so that the total number will not exceed $99.99.

Assuming that an error situation was not present then for the situation of switch 110 in the add position, the end of the state S6 is marked by the field counter 80 being in count state "0" which is used by the input logic 71 to shift the system into the state S7. The state S7 is used in the "subtract" operation for enabling the vending operation, but also to check on the correctness of the dialed-in result and on the new credit balance. The same is necessary here for add and also, button H could be pressed to cancel the transaction in case of mistake. For completing the add-transaction, the clerk presses button I to signal that the proper amount has been paid to him, i.e., that the dialed-in number matches the payment made, and with such a control signal he then triggers shifting of the system to state S8. The card will be ejected and the new credit balance will be recorded onto the credit card. The unit C will be constructed exclusively for the adding operation if used, for example, merely as credit check. In this case card 10 is a credit card to be used in the conventional manner, but all purchases are added to the credit balance (actually a debit balance to the user). When the card is inserted in unit C, the balance will be displayed first and the salesman to whom the card has been presented for payment then can see whether the total amount of previously made purchases exceeds the permitted limit. If it does, acceptance of the card can be refused. In case of stolen credit cards the amount lost to the true owner is thus limited. Operation of dial-in and recording are then as aforedescribed.

This now leads to another, more sophisticated modification of the system. The unit may, for example, be equipped with a transmitter which sets the pulses as they are being dialed in into a cable. These dialed-in values are then recorded additionally, for example, in a bank where the holder of the credit card has an account. In this case the state S6 signal enables the transmission of the dialed-in value to the bank. The dialed-in value is subtracted from the account of the credit card holder by the computer of the bank. Having done that, a signal analogous to the above mentioned "vend completed" signal is transmitted from the bank to the unit and the new credit balance will be recorded. Of course, it is necessary in this case that the holder of the card must somehow inform the bank from which account the amount to be credited to his card has to be withdrawn. This can be done in such a manner that the card 10 is provided with a second track cooperating with a second transducer which operates only the read mode. This second track holds the code identification numbers such as the bank account number of the holder of the card. The second read-head reads that number, and the resulting pulses are set directly into a cable which links the unit with the bank and which will be used for addressing the computer of the bank. Subsequently then the amount of money is being dialed in and transmitted to the bank, and the bank computer can establish the proper credit balance of the account of the holder.

The aforementioned operation may be carried out, for example, through regular telephone lines, and FIG. 5 includes an adaption of unit C for that purpose. A coupler unit 120 is provided for transmitting the dialed pulses to an external remotely positioned device. For example, the credit controller unit C may be installed in a telephone booth and coupled to the telephone line. In particular the coupler unit 120 may couple the add-output line of dial G to the telephone line. The user of the card first calls the bank where he has an account, and asks the telephone connection to be coupled to the computer of the bank. A sound signal may inform him that the computer is ready to receive data. He then dials through dial G (which may be separate from the telephone dial) the amount he wishes to add to his credit balance on the card. The arithmetic operations in unit C are carried out as aforedescribed for credit incrementation. Concurrently, the dialed-in pulses are transmitted through the telephone line to the bank and the user's account is debited by the same amount for which the credit card balance is increased. Should the bank account be overdrawn by this transaction, a code signal is received by coupler 120, decoded and used to set error flip-flop 81. A different code is used if the account can be properly debited, and the decoupler decodes that second code to use in an analogous manner as operation of button I is used, completing the transaction by instituting the S8–S9 state sequence.

It can readily be seen that by coupling unit 120 to line 96 and setting switch 110 into the "subtract" position the reverse operation can be performed in that the user of the card makes payment to an account in that manner. Pressing button I at the end of dialing has then again the same effect as in the "vend completed" operation when not automatically controlled.

One can see that the overall system as established herewith is definitely superior over a system wherein, for example, vending machines respond merely to credit card code numbers and communicate directly with computers in banks which keep track of the bank accounts of the card holders. Such a system requires an extensive amount of linkage between the credit card operated vending machines and the bank. A system in accordance with the invention may require merely placements of units in "strategic" places where a credit card holder can increase the amount of credit on his particular credit. The vending machines, admission gates, etc., would then operate only with these credit cards, which will he highly conducive to a wide distribution of such type of machines.

Now some concern has to be given to the problem of tampering with a card. It was described above how the unit is constructed to cause it to respond only to cards of proper size and shape and proper insertion. It was also mentioned above that during read-in an error situation exists if more or less than four fields are monitored. If somebody tampers with the credit card filling in one gap, he in effect invalidates the card in its entirety, as all units will reject such card. Additionally, of course, by filling in the space in between two fields they are serially combined and the total number of pulses of that field may well exceed 10, which is already an error situation, per se. It is, however, conceivable that two fields are combined in that manner by "placing" a pulse in the space and still only ten pulses or less are in that field. Then the forger could, for example, proceed by adding pulses at the end of the track to create an additional field so that the total number of fields will remain four. But here the following two points should be observed.

The fields are arranged on the card so that the field closest to trailing edge 11 of the card always holds the most significant decade. Therefore, adding a field or adding pulses can only effect the other more or less open end of the track where the least significant decade is recorded. It is, therefore, possible only to add a field representative of a least significant decade digit. It should be remembered that what is recorded on the card is actually the tens complement of the credit balance. Thus, upon adding of a pulse in between two fields, i.e., upon combining, for example, the two fields holding the complement of the most and the second most significant digit, a forger would create a most significant digit field having more pulses than the most significant digit field held before.

Looking at FIG. 3 the credit balance there was $96.07. It now is shown by a dashed pulse what transpires if forger puts a pulse in between the first and second field. He thereby combines the first and second fields. If he adds a pulse at the end to the right to create another field, then he will obtain this result. The first (original) field with the most significant digit holds two pulses representing digit 1 (tens dollar value being 90), the second field with five pulses represents digit 4, unit dollar value being 6. These two fields together define the dollar amount of the credit balance of %96.00. If now the forger adds a pulse in between the two fields, he would reduce the tens dollar value of the credit balance of the card from $90.00 to $30.00, an obviously senseless thing for a forger to do. It follows, therefore, that credit balances can be increased only by subtracting, i.e., by diminishing the number of pulses as recorded. This can be prevented in the following manner.

The gap detector 82 of the system responds to the absence of a pulse. It can now be designed so that it responds and detects a proper gap as the absence of one pulse only. A larger gap prior to count state S3 of field counter 80 can then again be treated as an error situation. If the detector 82 includes a reset integrator, absence of more than one pulse can be detected by responding to a second signal level which should not be reached if the gap is a properly short one.

The forger may proceed by subtracting pulses from higher significant decades and adding pulses to the lower significant decade to maintain the gap length of one missing pulse. This can be counteracted by providing the motor 55 with a rather accurate speed control to operate the motor 55 as a synchronous motor from the mains and be feeding the pulses read to a pulse-testing unit which tests the wave shape of the pulses to detect forgeries carried out by changing the pulse pattern in such a rather crude way. Finally, therefore, the "ultimate" forgery would be the writing pulse patterns on a card with the same type of equipment as described. This cannot be prevented, per se, but the effect can be minimized by providing additional magnetic code patterns on the card and corresponding code readers in control unit C, and by changing the code patterns from time to time, either necessitating issuance of new cards, or the recording of new code patterns by the control units, preferably at random time intervals.

The system is susceptible to modifications other than those discussed above. For example, two counters or counter systems (750 and K) can be substituted by one counter system where the individual decade counters can be counted in two directions so that subtraction will not have to be performed by forming the complement of a number and adding the complement. Therefore, in this case, one can but still does not have to record the tens complement of the digits defining the credit balance, instead the credit balance digits can be recorded directly in the code format as described. This, however, brings the problem of forgery again into play so that by adding of a pulse in a gap and creating another field at the end of a track the credit balance can be increased. Such forgery, however, can be avoided in the following manner. In the record mode, as soon as the fourth field has been recorded, a high-frequency source is connected to the read head, so that after recording the fourth field the remainder of track is not magnetized in the same way as during pulse pauses but the track is, in effect, demagnetized and becomes magnetically neutral.

In the read mode that demagnetized track portion is read first because read and write operations are carried out at opposite directions of card motion. Since the read method employed is strictly DC responsive, the transducer can distinguish between a magnetization in one direction, magnetization in another direction and no magnetization at all. Therefore, in the read mode, when the card enters the read head there should first be no magnetization, resulting in zero signal level in the read sense wire. Then, before the first pulse, the magnetization should be the "background" magnetization and the first data pulse should be a magnetic field reversal from that background magnetization. If a pulse is now added into the demagnetized area then the first pulse does not appear as flux change from "background" magnetization to pulse magnetization, but from zero to "pulse" magnetization. Such magnetization sequence will result in a different amplitude excursion and can definitely be monitored by an appropriate detector connected to the read head. The resulting signal sequence can then be recognized as an error situation for flip-flop 81 and it, in effect, invalidates the card permanently.

The above-described "packed" code is specifically defined in that the gap in between fields is defined by absence of but one pulse. This information packing has been chosen primarily for reasons of preventing forgery. One may, however, for reasons of simplifying control, particularly as far as field counting is concerned, employ constant field length instead. Each field is then actually 10 pulses long, so that the gap has a length of one pulse plus 10 minus the recorded data pulses. This is illustrated in FIG. 9, showing a somewhat simplified version of the inventive system, and only to the extent that the system of FIG. 6 is affected by the simplification. The pulses read from a card as aforedescribed pass through line 45 directly into a single counter 76. One pulse is suppressed as aforedescribed. As gap detector 82 detects "gap," clock pulses are set into counter 76 until recycling (signal in line 769). The same number of clock pulses is set through distributor logic 95 into the first one of counters K. The number of pulses is thus the complement of the first decade field read. The field counter 80 could be incremented by gap detector 82 as aforedescribed, but for reasons of noise suppression it may be advisable to control the field counter differently, and to simply inhibit further pulse transmission as long as "gap" is being detected.

As counter 76 recycles, field counter 80 is incremented and the system awaits the pulses read from the next field, which will arrive shortly and are set again into counter 76. Upon gap detection counter 76 is upcycled again through clock pulses and the corresponding number of clock pulses is set into the second decade counter of counters K, etc. After the four fields have been read, all of the four serially provided, recorded and now reproduced pulse sequences have passed through counter 76, and the respective complements have been distributed into counters K.

Assuming now that the card is used as debit card and/or for credit and purchase limit check, the dialed-in number will be added to the credit balance held in counters K. Dial G is thus coupled to distributor logic 95 and field counter K as was described above for the adding process.

For recording counters K are sequentially upcycled to zero. As each counter of counters K is thus upcycled to be recycled to zero, the same clock pulses are set into counter 76, and are also recorded as aforedescribed. An output logic 199, essentially similar to logic 99 together with elements 37 and 38 of FIG. 6, is also used here to provide one additional pulse as field control pulse to be recorded after the respective operating one of counters K has recycled through zero. This pulse is not counted in counter 76. Thereafter write gate 36 is blocked, for example, through gate 900 also included in logic 199 and remains blocked until counter 76 is recycled to zero. Thus, the upcycling of any of the counters K is stopped when completed, but shifting to the next decade is deferred until counter 76 is also back to zero again. This meters the total field length in clock pulse units. Each field is as long as it takes counter 76 to complete a cycle which requires ten pulses, plus the one field control pulse which was not counted in counter 76. As counter 76 recycles to zero (line 769) field counter 80 is incremented to now shift the operation to the next decade. For the period of pulse suppression and extended gap production the HF source mentioned above may be turned on to establish zero magnetization in the more or less long gap in between meaningful data to prevent subtraction of pulses when the complement is used.

This simplified device can readily be operated to record each decimal digit directly rather than its complement. For this, each one of the counters K is upcycled and to zero, and the corresponding number of pulses is set into counter 76. After the respective one of counters K has reached zero, the counter 76 continues to receive pulses, and these are then recorded; their number is equal to the number held initially in the one counter of counter K. The additional pulse will be provided as aforedescribed and the system then shifts to the next decade. For reproducing the pulses read are set directly into counters K and distributed as was described above with respect to counters 750 during state S3.

The invention is not limited to the embodiments described above but all changes and modifications thereof not constituting departures from the spirit and scope of the invention are intended to be covered by the following claims.

We claim:

1. A system for cooperation with a credit card having a magnetizable layer on which are recorded digital signals as spatially varying magnetizations and identifying a number representing a credit balance, comprising:

transducer means including reproducing means responsive to static and quasistatic magnetic fields and providing electrical signals having sign and amplitude related to direction and strength of a magnetic field as affecting the transducer at any instant;

first means for placing the credit card in relation to and moving the credit card past the transducer to energize magnetically the transducer in accordance with the spatially varying magnetization on the card so that the resulting varying magnetic field affecting the transducer causes the reproducing means to produce correspondingly varying first electrical signals;

second means connected to the transducer means to be responsive to said first signals for storing representations of the first signals as digital representations of the number representing the credit balance as recorded on the card;

third means for providing second electrical signals representing a digital number;

fourth means responsive to the second electrical signals for processing the second electrical signals and the first stored signals in corresponding to an arithmetic process for the number represented by the second electrical signals and the number representing the credit balance, to obtain third electrical signals representing a resulting number identifying a new credit balance;

fifth means included in the transducer means and being responsive to the third electrical signals for providing variably directed magnetic fields in representation thereof; and sixth means for operating the first means to obtain placement and passage of the card in relation to the transducer means upon operation of the fourth means to the exclusion of the recording means, so that the magnetization as provided by the fifth means are recorded on the card.

2. The system as set forth in claim 1, the reproducing means in the transducer means including at least one Hall generator and further including means for coupling the Hall generator to the card upon operation of the first means.

3. The system as set for in claim 2, the second means comprising at least one electromechanical counter for counting output pulses as provided by the Hall generator.

4. A system as set forth in claim 2, the transducer means including a core having a first gap in which is inserted the Hall generator, and in having a second gap for passage of the card therethrough.

5. A system as set forth in claim 4, the transducer means including coil means connected for receiving the third signal to magnetize the core, the resulting magnetic field traversing the second gap as magnetizing the portion of the carrier in the second gap.

6. A system as set forth in claim 1, the second means comprising a plurality of counters for respectively counting the pulses of the trains of the first electrical signals and including means responsive to pauses in-between respective two of said trains of first signals for controlling the sequential distribution of the pulses into the counters.

7. A system as set forth in claim 1, the third and fourth means including means providing sequentially trains of magnetizing pulses in representation of the third signals, each train representing a decimal digit, the first electrical signal comprising accordingly trains of pulses, each train of the first pulses representing a decimal digit.

8. A system as set forth in claim 1, the second means including a display means for displaying the number representative of the first signals.

9. A system as set forth in claim 1, the first means including motor-driven conveyor means for engaging a card and passing the card past the transducer means in one or the opposite direction;
  first control means operating the reproducing means of the transducer means for providing reproduction and controlling the conveyor means to move the card in the one direction; and
  second control means operating the fifth means in the transducer means for recording and including the sixth means for controlling the conveyor means to move the card in the opposite direction.

10. A system as set forth in claim 9 and including error detection means responsive to a particular format of the first signals for blocking operation of the second control means to inhibit the recording operation as provided by the fifth means in the absence of the particular format.

11. A system as set forth in claim 1 including error detection means responsive to a particular relation between the numbers represented by the first and second signals to obtain blocking of the operation of the fifth means in the absence of the particular relation.

12. A system as set forth in claim 1 including means for selectively operating the fourth means to provide addition or subtraction of the numbers.

13. A system as set forth in claim 1 and including means responsive to completion of the arithmetic process as provided by the third means to provide a control signal for use external to the system.

14. A system as set forth in claim 1, the third means comprising manually operable digit selector means which upon manual operation provide the second signals as a sequence of pulses.

15. A system as set forth in claim 14 comprising means for coupling the manual selection means to a signal transmission facility.

16. A system as set forth in claim 1, including means for providing a recording representative of the digital number as sequentially provided by the third means and as representative of cooperation of the system with different cards.

17. An apparatus for storing information, comprising:
  a transducer having a gap and providing a magnetic field in one or the opposite direction across the gap;
  first means coupled to the transducer for providing electrical signals of alternating polarity to obtain magnetic fields of alternating direction across the gap;
  second means coupled to the first means for obtaining the providing of the electrical signals, one signal per bit of information, one additional bit per decimal decade of digital information, the electrical signals following each other in regular sequence pertaining to one decade;
  third means coupled to the second means and providing absence of at least one electrical signal in between two decades of digital information; and
  fourth means for moving a card having a magnetizable layer sandwiched in between two nonmagnetic layers through the gap so that the magnetic field of either direction transversely traverses the card.

18. A system for cooperation with a card having a magnetizable layer, comprising:
  first means providing manifestations of digital signals;
  second means connected to the first means and including a source for providing a sequence of pulses representative of the digital signals;
  third means defining a magnetic flux path including a gap and being connected to the second means to provide magnetization across the gap alternating in one and the opposite direction in accordance with the pulses of the sequence;
  fourth means for moving the card through the gap so that a progressing portion of the magnetizable layer is magnetized in the normal of the card and in accordance with the magnetization in the gap; and
  fifth means sequentially responsive to different decimal digits as provided by the first means to couple the pulse source to the third means for periods in proportion to the different digits.

19. A system as set forth in claim 18, the fifth means controlling the connection of the source to the third means for providing a particular number of pulses to the third means for each decimal digit and suppressing at least one pulse in between the pulse representing different decimal digits.

20. A system as set forth in claim 19, the fifth means including means controlling the number of pulses representing a decimal digit to be one more than the value of the decimal digit.

21. A system as set forth in claim 18, the fifth means including means for suppressing for each decade a number of pulses corresponding to the tens complement of the digit represented by recorded pulses.

22. An apparatus as set forth in claim 18, the second means providing the electrical signals at a format so that the magnetic field reverses twice per digital bit.

23. A system as set forth in claim 18, the first means being a plurality of decimal counters, the second means including a pulse source and further including fifth means for sequentially incrementing the counters to zero and further including sixth means for sequentially feeding groups of pulses from the source to the third means, the number of pulses in groups being respectively equal to the number of steps required to increment the counters.

24. A system for cooperation with a credit card on which manifestations of a credit balance are recorded in several data fields of different numerical significance and arranged along a track, comprising:
  first means for reading the information stored on the card and providing groups of pulses representative of the data of the fields;
  second means connected to be responsive to the pulses of the groups for storing them;
  third means for providing manual selection of digital number representations as groups of pulses;
  fourth means connected to the third means for arithmetically processing the pulse groups as provided by the third means and the pulses as stored by the second means;
  fifth means connected to be responsive to manifestations representing the result of the processing as provided by the fourth means and providing groups of pulses representative thereof; and
  sixth means connected to the fifth means and coupled to the card for recording the groups of pulses as provided by the fifth means on the card.

25. A system for cooperation with a card having a magnetizable layer, comprising:
  first means providing manifestations of digital signals;
  second means connected to the first means and including a source for providing a sequence of pulses representative of the digital signals;
  third means defining a magnetic flux path including a gap and being connected to the second means to provide magnetization across the gap alternating in one and the opposite direction in accordance with the pulses of the sequence;
  fourth means for moving the card through the gap so that a progressing portion of the magnetizable layer is magnetized in the normal of the card and in accordance with the magnetization in the gap;
  fifth means for selectively providing manifestations of a first number; and
  sixth means for automatically processing the first number to obtain a second number constituting the digital signals.

26. A system for cooperation with a card, having a magnetizable layer, comprising:
  first means providing manifestations of digital signals;
  second means connected to the first means and including a source for providing a sequence of pulses representative of the digital signals;

third means defining a magnetic flux path including a gap and being connected to the second means to provide magnetization across the gap alternating in one and the opposite direction in accordance with the pulses of the sequence;

fourth means for moving the card through the gap so that a progressing portion of the magnetizable layer is magnetized in the normal of the card and in accordance with the magnetization in the gap; and fifth means for providing HF signals to the third means in the absence of pulses as provided by the second means.

27. A system for cooperation with a card, having a magnetizable layer, comprising:

first means providing manifestations of digital signals;

second means connected to the first means and including a source for providing a sequence of pulses representative of the digital signals;

third means defining a magnetic flux path including a gap and being connected to the second means to provide magnetization across the gap alternating in one and the opposite direction in accordance with the pulses of the sequence;

fourth means for moving the card through the gap so that a progressing portion of the magnetizable layer is magnetized in the normal of the card and in accordance with the magnetization in the gap; and fifth means in the flux path responsive to magnetization induced in gap;

sixth means operating the fourth means for moving the card in the reverse direction; and control means for disabling the second means and enabling the fifth means upon operation of the sixth means.

* * * * *